US006889167B2

(12) United States Patent
Curry, III

(10) Patent No.: US 6,889,167 B2
(45) Date of Patent: May 3, 2005

(54) DIAGNOSTIC EXERCISER AND METHODS THEREFOR

(75) Inventor: John W. Curry, III, Union City, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 51 days.

(21) Appl. No.: 10/376,436

(22) Filed: Feb. 27, 2003

(65) Prior Publication Data

US 2004/0172219 A1 Sep. 2, 2004

(51) Int. Cl.[7] ............................................. G06F 15/00
(52) U.S. Cl. ................ 702/183; 702/123; 702/182; 702/183; 702/184; 702/185; 712/244; 712/233; 710/264; 710/260; 719/310; 719/321; 714/25; 714/31; 717/127; 713/164
(58) Field of Search ................. 717/127; 713/164, 713/187; 702/117, 119, 120, 123, 182–183, 186; 712/244, 233; 710/264, 260; 719/310, 321; 714/25, 31

(56) References Cited

U.S. PATENT DOCUMENTS

| | | | | |
|---|---|---|---|---|
| 4,591,972 A | * | 5/1986 | Guyer et al. | 712/228 |
| 5,630,049 A | * | 5/1997 | Cardoza et al. | 714/25 |
| 6,253,317 B1 | * | 6/2001 | Knapp et al. | 712/244 |
| 6,314,530 B1 | * | 11/2001 | Mann | 714/38 |
| 6,341,324 B1 | * | 1/2002 | Caulk et al. | 710/260 |
| 6,714,976 B1 | * | 3/2004 | Wilson et al. | 709/224 |

OTHER PUBLICATIONS

Rashid et al., 'Mach: A System Software Kernel', 1989, IEEE Article, pp. 176–178.*
Schoinas et al., 'Address Translation Mechanisms in Network Interfaces', Dec. 1998, WISC EDU, pp. 1–12.*

* cited by examiner

Primary Examiner—Marc S. Hoff
Assistant Examiner—Elias Desta

(57) ABSTRACT

A computer-implemented method for diagnosing the performance of a computer system using a diagnostic application. The method includes providing a diagnostic application and providing an operating system (OS) kernel, the diagnostic application being configured to execute under the OS kernel in the computer system, the OS kernel having a kernel trap arrangement. The method also includes providing a diagnostic monitor, the diagnostic monitor being configured to execute cooperatively with the OS kernel, the diagnostic monitor having a monitor trap arrangement. The method additionally includes ascertaining, using the diagnostic monitor, whether a trap encountered during execution of the diagnostic application is to be handled by the OS kernel or the diagnostic monitor. Furthermore, the method includes passing, if the trap is to be handled by the OS kernel, the trap to the OS kernel for handling.

26 Claims, 12 Drawing Sheets

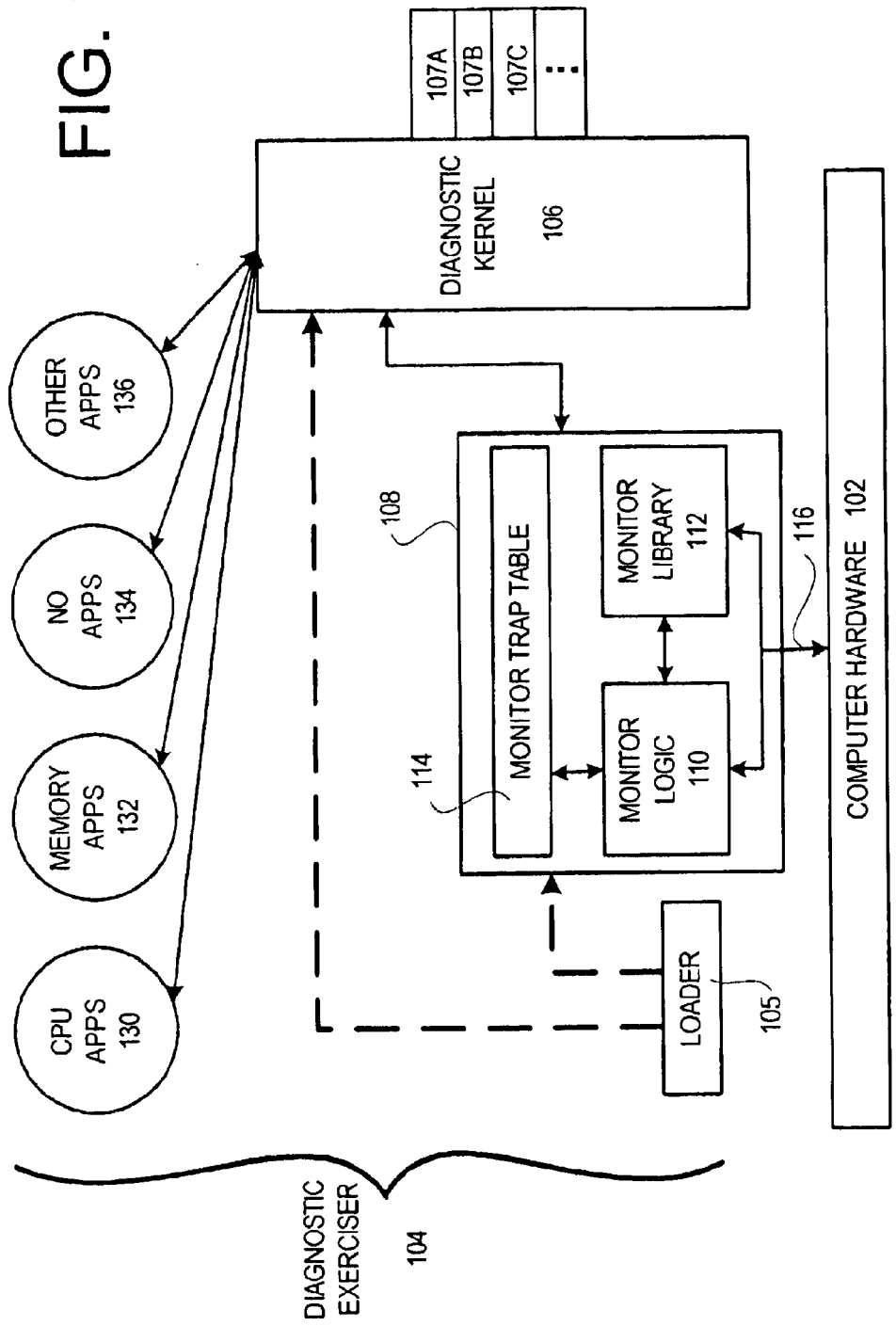

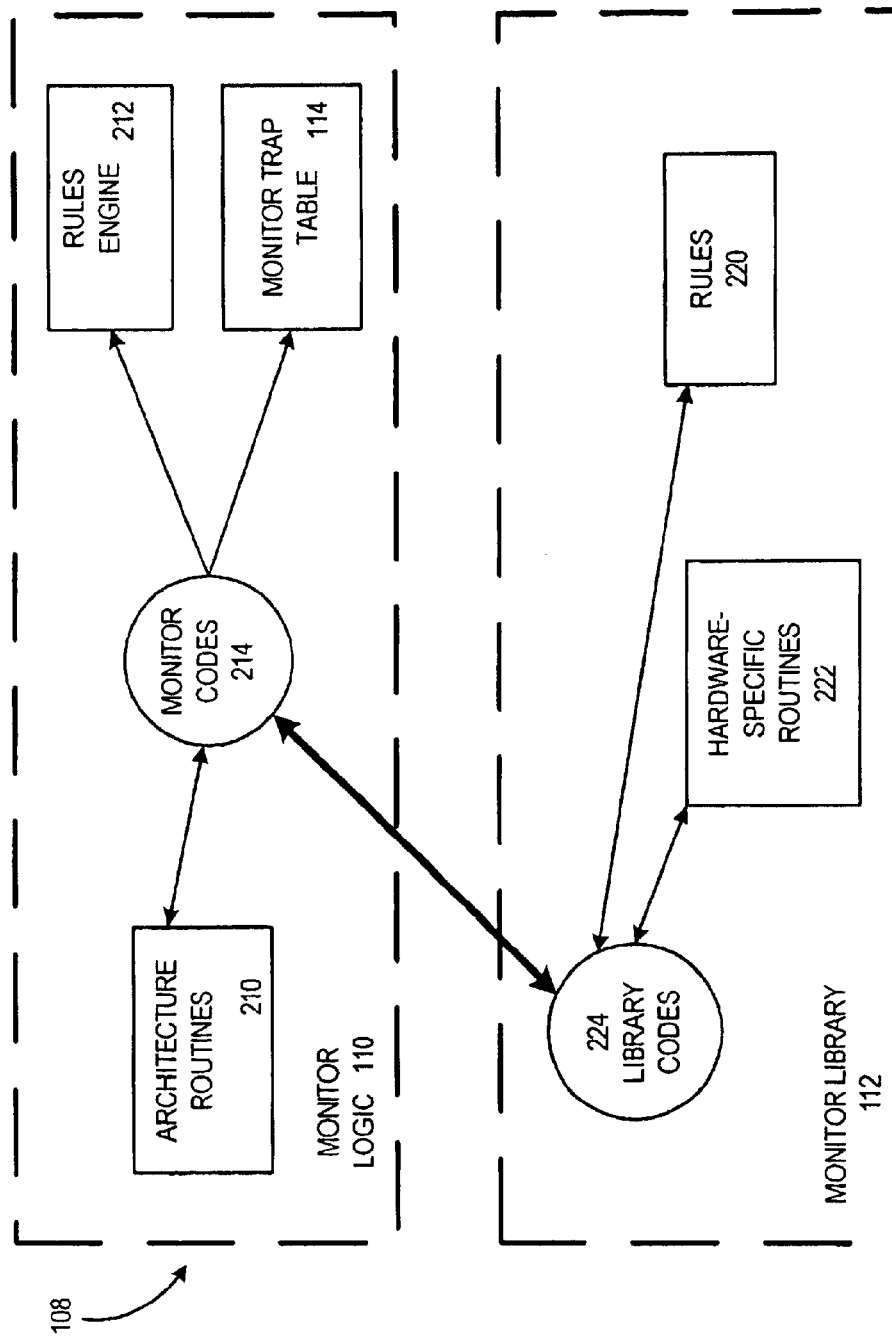

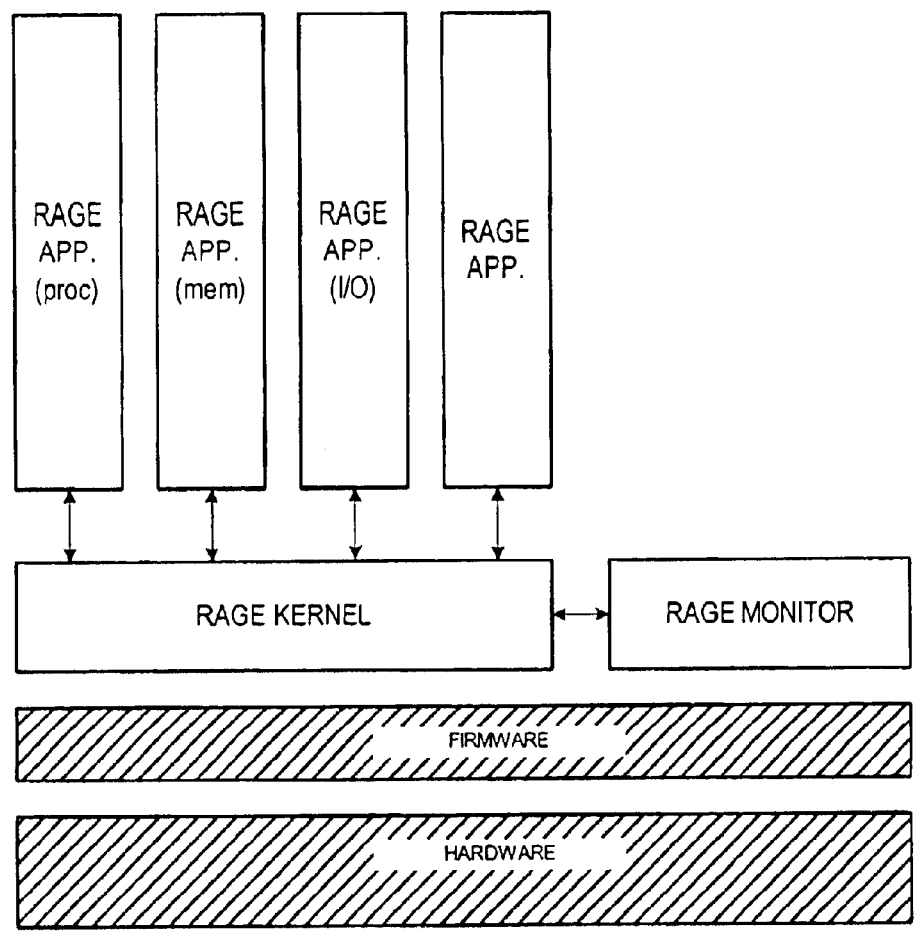
FIG. A1

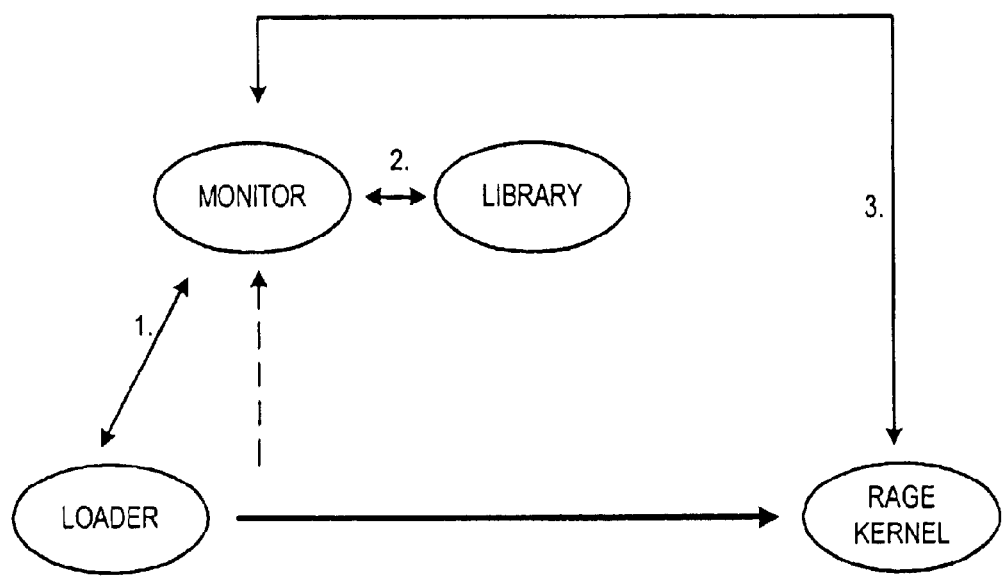
FIG. A2

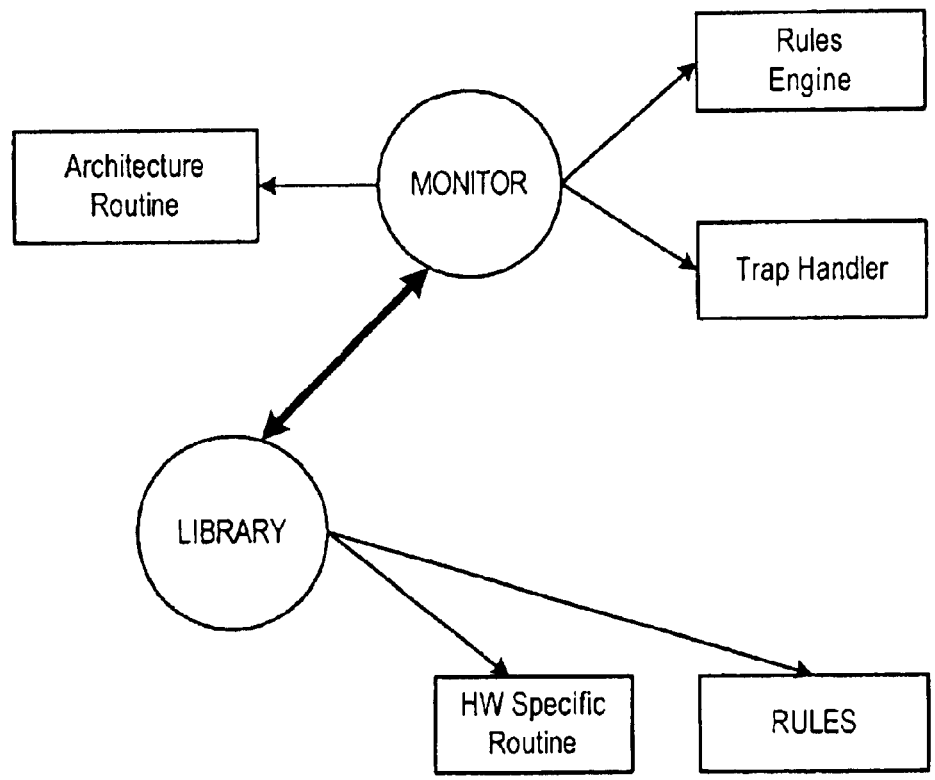
FIG. A3

DIAGNOSTIC EXERCISER AND METHODS THEREFOR

BACKGROUND OF THE INVENTION

As computers and operating systems become more complex, failure and performance analysis become more difficult. For reliability reasons, it is highly desirable to exhaustively test computer systems prior to introducing them into service. Generally speaking, it is possible to create codes to test specific portions of the computer system hardware. However, such narrowly focused tests do not stress the entire computer system as a whole, and do not reflect the way in which the computer system tends to be used in the field.

Another approach involves employing diagnostic tools, such as diagnostic exercisers, that execute under operating systems to detect errors. Nowadays, diagnostic exercisers are typically designed to execute under a production operating system ("OS"), e.g., Linux, HPUX™ (Hewlett-Packard Company, Palo Alto, Calif.) or Windows (Microsoft Corporation, Redmond, Wash.), and the like. By employing specifically designed applications that use special drivers and/or operating system calls, diagnostic exercisers executing under a production OS can stress the computer system in specific ways and detect certain errors when they occur. Because these diagnostic exercisers employ the OS, their applications can stress the hardware more fully and in ways that are more similar to the way the computer system would be used in the field, e.g., involving features such as multi-threading, rapid disk I/O operations, and the like.

In general, the amount of stress experienced by the computer system can vary depending on which diagnostic exerciser applications are being executed. When a given diagnostic exerciser executes under a production operating system, such diagnostic exerciser is however restricted in capabilities by the operating system. For example, due to competitive reasons, production operating systems tend to be optimized for performance in the field and not for extensive diagnostic capabilities. Thus, a diagnostic exerciser executing under such a production OS tends to be restricted in its diagnostic capability. Analogously, other features useful for data gathering, error detection, and error analysis may not be available in a production OS since the provision of such features would unduly hamper OS performance and/or compromise the security of the computer system in the field.

Furthermore, most diagnostic exercisers executing under a production OS tend run as privileged processes and/or drivers. This fact tends to limit their usefulness in a kernel crash situation. For example, if the kernel crashes during kernel booting, the common diagnostic monitor of the prior art diagnostic exerciser would not have been started, thereby being of little value for the detection and analysis of kernel boot failures.

Additionally, when the kernel crashes, most common diagnostic techniques involve obtaining a kernel dump and analyzing the kernel dump data. However, such diagnostic techniques are inherently limited by the information saved in the kernel dump file. If the programmer who originally designed the kernel dump program decided not to save certain information, such information will not be available in the kernel dump file for analysis. Furthermore, the content and format of the information available in the kernel dump file may vary depending on the discretion of the programmer who originally designed the kernel dump. Accordingly, the kernel dump information may be difficult to decipher, and it may be necessary to find the programmer who originally designed the kernel to obtain assistance in analyzing the kernel dump file. If a long period of time has elapsed between the time the OS is produced and the time a particular error occurs that results in the kernel dump, the programmer may no longer be available to assist, and the use of kernel experts maybe required to sift through the kernel dump data.

SUMMARY OF THE INVENTION

The invention relates, in one embodiment, to a computer-implemented method for diagnosing the performance of a computer system using a diagnostic application.

The method includes providing a diagnostic application and providing an operating system (OS) kernel, the diagnostic application being configured to execute under the OS kernel in the computer system, the OS kernel having a kernel trap arrangement. The method also includes providing a diagnostic monitor, the diagnostic monitor being configured to execute cooperatively with the OS kernel, the diagnostic monitor having a monitor trap arrangement. The method additionally includes ascertaining, using the diagnostic monitor, whether a trap encountered during execution of the diagnostic application is to be handled by the OS kernel or the diagnostic monitor. Furthermore, the method includes passing, if the trap is to be handled by the OS kernel, the trap to the OS kernel for handling.

In another embodiment, the invention relates to an arrangement in a computer system, for diagnosing the performance of a computer system while executing an application program. The application program is executed under an operating system (OS) kernel. There is included a diagnostic monitor configured to execute cooperatively with the OS kernel. The OS kernel has a kernel trap arrangement for handling at least one of a trap-type message and an interrupt-type message generated during the execution of the application program. The diagnostic monitor is capable of continuing to execute after the OS kernel crashes. The diagnostic monitor includes a monitor trap arrangement for handling at least one of the trap-type message and the interrupt-type message. The diagnostic monitor is configured to receive traps generated during the execution of the application program and decide, for a given trap received, whether the OS kernel would handle the trap received or whether the diagnostic monitor would handle the trap received.

In yet another embodiment, the invention relates to an article of manufacture comprising a program storage medium having computer readable code embodied therein. The computer readable code is configured to handle errors in a computer system. There is included computer readable code implementing a diagnostic monitor. The diagnostic monitor is configured to execute cooperatively with an operating system (OS) kernel in the computer system. The diagnostic monitor includes a monitor trap arrangement configured to receive traps generated in the computer system. The OS kernel has a kernel trap arrangement configured to handle traps passed from the diagnostic monitor. There is also included computer readable code for loading the diagnostic monitor at system startup prior to loading the OS kernel.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 illustrates, in accordance with one embodiment of the present invention, a diagnostic environment that includes computer hardware under diagnostic, and a diagnostic exerciser.

FIG. 2 illustrates the diagnostic monitor in greater detail in accordance with one embodiment of the present invention.

Figure 3A:
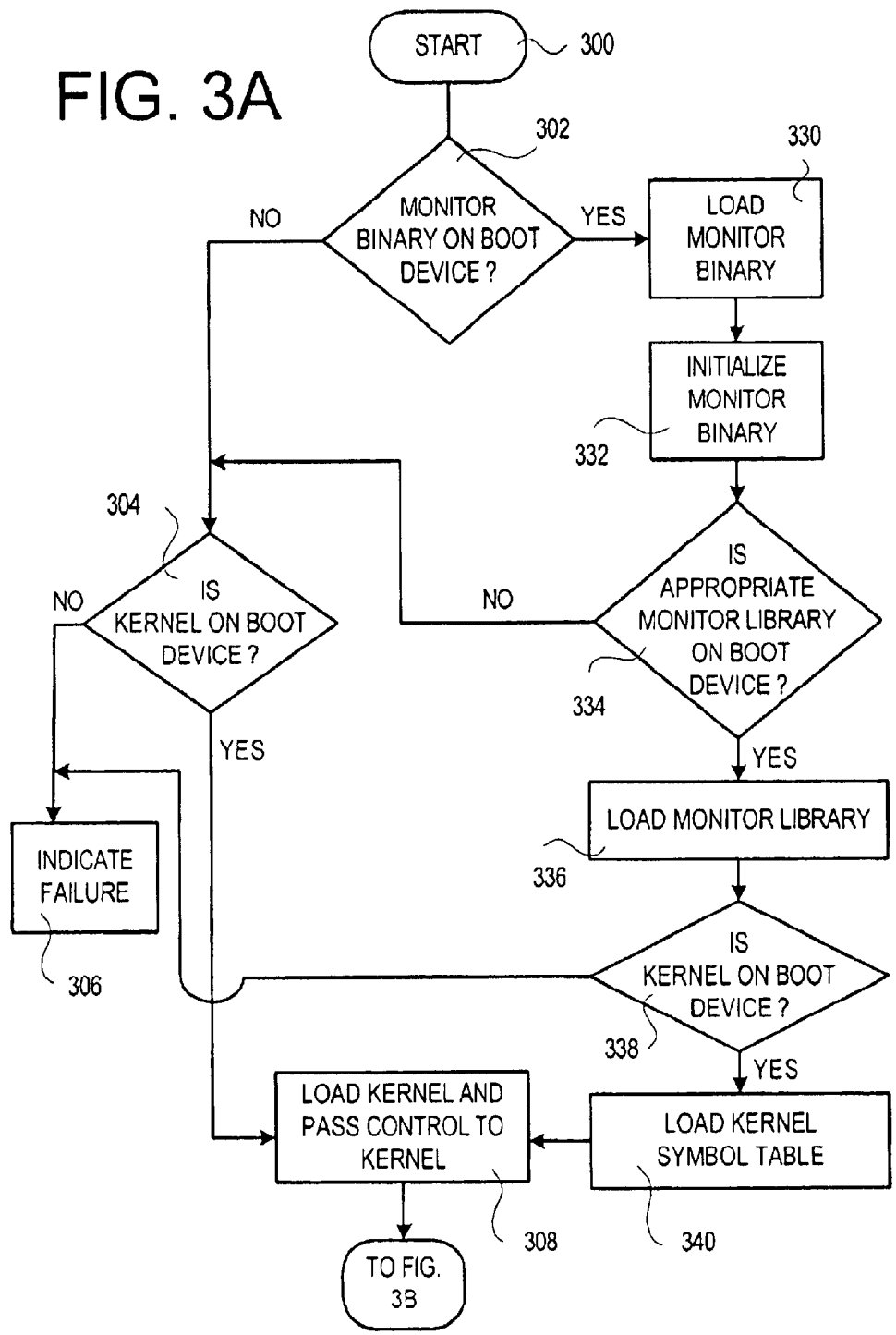
FIG. 3 illustrates, in accordance with one embodiment of the present invention, the loading sequence upon initialization.

FIG. A1 shows, in accordance with one exemplary implementation of the present invention, the basic modules that make up the RAGE exerciser platform.

FIG. A2 shows, in accordance with one exemplary implementation of the present invention, the basic functionality of the loader.

FIG. A3 shows, in accordance with one exemplary implementation of the present invention, the major components of the Monitor.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In accordance with one embodiment of the present invention, there are provided diagnostic arrangements and techniques that combine the advantages offered by the pure off-line diagnostic approach, e.g., extensive access to and control of the computer hardware and ease of error detection and analysis, with the advantages offered by the on-line OS-based diagnostic approach, e.g., the ability to stress the hardware more fully and in ways that are more representative of the stress experienced by the computer hardware in the field.

As the terms are employed herein, a diagnostic tool is said to be off-line if it does not employ the OS in its diagnostic tasks. Off-line diagnostic tools can have extensive access to and/or control of the individual hardware subsystems but their diagnostic approach tends to be based on localized stimulus-responses. Stimulus-response tests based on off-line diagnostic tools have been known to be unsuitable for efficiently detecting certain transient errors.

Further, the off-line diagnostic tools do not stress the computer system hardware in a comprehensive way nor do they stress the computer system hardware in ways that are representative of the stress experienced by the computer hardware in the field. Accordingly, it has been necessary to employ a large number of stimuli (and a large number of permutations thereof) in order ensure that tests performed cover most of the scenarios that the subsystems under test would likely experience in the field. On the positive side, since off-line diagnostic tools tend to test individual subsystems of the computer system hardware based on stimulus-response tests and without having the OS acting as the intermediary, extensive access to and/or control of the hardware functionality is possible and error isolation and analysis tend to be less complex.

In contrast, a diagnostic tool is said to be on-line if it employs the OS in its diagnostic task. When the diagnostic applications execute under the OS, control of the hardware is achieved in a less direct manner and access to hardware is much more restricted. However, the on-line diagnostic applications can more fully stress the computer system as a whole, employing OS-related features such as multi-threading, rapid I/O accesses, and the like. Because the on-line diagnostic applications execute under the OS, the computer system tends to be stressed in ways that are more similar to those experienced by the computer hardware in the field. Furthermore, the time spent in testing can be shorter with an on-line diagnostic tool since the tests can be more directed toward the likely and/or realistic usage scenarios instead of, as in the case with the off-line diagnostic exerciser, randomly testing various permutations, some of which may be unrealistic and/or may never be experienced by the computer system in the field.

The additional capabilities of on-line diagnostic tools, however, come at the cost of inflexibility and complexity. Since existing OS-based diagnostic tools tend to execute under a production OS (i.e., the OS employed in the field), security and performance considerations severely limit the diagnostic and/or analytical capabilities of the existing OS-based diagnostic tools. Depending on the design of the OS and/or the OS kernel, certain type of information may not be captured and/or be accessible for error detection and/or error analysis. Access to and/or control of the hardware may be severely restricted. Even if the information is captured, information such as kernel dump may be difficult to analyze to ascertain the source of error. OS-based diagnostic tools also tend to be difficult to isolate, in a concise way, the source of the error.

As mentioned earlier, embodiments of the inventive diagnostic exerciser combine the advantages offered by a pure off-line diagnostic approach with the advantages offered by the on-line OS-based diagnostic approach. To fully exercise the hardware system and achieve more directed testing of the computer system using tests that are more representative of the way the computer system is employed in the field, the diagnostic exerciser employs the OS. However, the OS employed is a non-production OS based on a diagnostic kernel. The use of a non-production OS and more particularly a non-production kernel modified to enhance diagnostic capabilities advantageously allows the invention to avoid the limitations of the production OS, which limitations are imposed based on, for example, security and/or performance reasons. Since diagnostic testing is performed in a controlled, non-production environment, security and performance in the field considerations are less important. Furthermore, a diagnostic monitor is provided to monitor and to work cooperatively with the non-production kernel.

As the term is employed herein, the diagnostic monitor is said to execute cooperatively with the non-production kernel since it does not operate under the non-production kernel. There are furnished, in accordance with certain embodiments of the invention, rule-based facilities to provide failure analysis in an easy to understand manner. Inventive techniques are employed to facilitate failure analysis even if the kernel crashes during booting or during execution of the diagnostic application programs.

In a preferred embodiment, a diagnostic monitor having detailed information about the kernel (i.e. data structures, kernel data locations, etc) is loaded into a memory area that is not used by the OS. The diagnostic monitor is loaded prior to kernel loading and booting and has control of the trap vector table. During the kernel boot, or while the kernel (i.e. OS) is running, any traps or interrupts that occur would be examined by the diagnostic monitor to determine how the traps or interrupts should be handled.

To elaborate, the trap/interrupt mechanism of modem computer architectures allows privileged code to run when certain conditions occur. Depending on the particular architecture, these conditions include certain hardware events and some software generated events. The trap/interrupt-based mechanism is exploited by the inventive diagnostic monitor to facilitate error detection as well as data collection and analysis pertaining to certain errors.

In general, all non-error traps would be passed by the diagnostic monitor to the normal kernel vector table. Otherwise, the diagnostic monitor would examine the trap information, along with any information it can gather from the kernel data structures in memory, and use this information for error isolation. Kernel panics may cause forced traps to the diagnostic monitor. For many architectures, process, time-slice events may cause non-error traps. These can be used by the diagnostic monitor to "monitor" hardware and kernel parameters at run-time. For example, if a CPU has a time-slice trap, the diagnostic monitor can determine whether or not that CPU was idle by examining the process data structure associated with the process being run on that CPU. If the CPU is idle, the diagnostic monitor can use it to check for errors. Once the checking is done, the CPU would be returned to its idle loop. In this way, the diagnostic monitor can lower its performance impact on the kernel.

In most common operating systems, semaphores are not timed. That is to say, if a kernel thread attempts to grab some semaphore, it will do so forever until it obtains the semaphore. However, if the kernel semaphore routines are altered so that they time out after a period of time, and force a trap, the diagnostic monitor can be used for analysis.

In accordance with one embodiment of the present invention, a loader program (the loader) is running initially. The loader then finds the diagnostic monitor from the boot device (such as a disk) and launches the diagnostic monitor. The diagnostic monitor initializes, and tries to determine what model of computer it is running on. In general, a given diagnostic monitor is compiled for particular machine architecture. The diagnostic monitor then requests that the loader to load the appropriate library module for the model of computer the diagnostic monitor is running on. The library has model-specific information about the computer being monitored, such as, the detection and isolation routines of various hardware errors. Furthermore, the library has detailed information about the operating system to be run.

The diagnostic monitor generally needs to know various OS details such as the layout of process data structures, where the OS will be loaded, etc. The symbol table of the kernel is also loaded and used by the diagnostic monitor so that the diagnostic monitor knows the locations of the fixed kernel data structures. The locations of most run-time kernel structures can be deduced by knowing the locations of certain fixed structures. For any exceptions, the kernel may pass the locations to the diagnostic monitor during OS initialization, or at the structure creation time. Additionally, the diagnostic monitor installs its trap vector table as the one to be used. It then returns control to the loader.

The details and advantages of the invention may be better understood with reference to the drawings and discussions that follow. FIG. 1 illustrates, in accordance with one embodiment of the present invention, a diagnostic environment that includes computer hardware 102 under diagnostic, and a diagnostic exerciser 104.

Diagnostic exerciser 104 includes a loader module 105, which is responsible for loading major components of diagnostic exerciser 104 into memory upon system initiation. These major components are discussed hereinbelow.

Diagnostic exerciser 104 includes a diagnostic kernel 106, representing the kernel of the non-production OS (e.g., a non-production Windows™ or Linux OS) employed for diagnostic purposes. There are provided with diagnostic kernel 106 a plurality of drivers 107a, 107b, 107c, representing some of the drivers provided to allow the diagnostic exerciser 104 to obtain information pertaining to I/O devices. Thus, when an I/O device fails, instrumentation may be performed on the associated driver to gather information from the card/device electronics to allow diagnostic exerciser 104 to analyze the error.

Generally speaking, it is preferable to keep the changes between diagnostic kernel 106 and the kernel of the production OS minimal in order to allow computer hardware 102 to be stressed in ways that are representative of the stress experienced by computer hardware 102 in the field. However, certain modifications will be required to allow the diagnostic monitor (discussed below) to perform its functions of monitoring kernel 106, error detection, and error analysis. In one embodiment, kernel 106 is modified to allow the initialization of the diagnostic monitor and the drivers, to facilitate communication with the diagnostic monitor during execution of the diagnostic applications, and to provide for additional diagnostic capabilities (such as processor affinity, physical memory allocation, and the like). Other possible changes to the production kernel are discussed further hereinbelow.

Diagnostic exerciser 104 also includes a diagnostic monitor 108, representing the monitoring software that is involved in detecting and analyzing errors. Diagnostic monitor 108 is designed to communicate with and to monitor kernel 106. In one embodiment, monitor 108 and kernel 106 are furnished as separate binary files, thereby rendering monitor 108 independent of the OS (i.e., monitor 108 runs with rather than runs under kernel 106). Monitor 108 is preferably loaded into a memory location that is unused by kernel 106 to avoid any unintended alteration of monitor 108 by kernel 106. When an error occurs with kernel 106, monitor 108 will attempt to analyze the error and isolate the problem to a FRU (field replaceable unit) or a list of potential offending FRUs. In this sense, the inventive diagnostic exerciser provides the error isolation granularity typically associated with off-line diagnostic tools.

As shown in FIG. 1, diagnostic monitor 108 includes three main modules: monitor logic 110, monitor library 112, and monitor trap table 114. Monitor logic 110 is architecture-dependent (e.g., PARISC™, Itanium™, etc.).

Depending on the specific architecture and the type of box of computer hardware 102 (the information pertaining to which may be obtained via link 116), the appropriate monitor library 112 would be loaded. Monitor library 112 is thus both architecture-specific and box-specific in one embodiment.

Monitor trap table 114 represents the trap table that is in control during execution of the diagnostic applications. As will be discussed later herein, one of the major functions of diagnostic monitor 108 is to control the trap handler. Any trap encountered by kernel 106 would be examined by monitor 108, which will decide whether it will handle the trap itself or will pass the trap on to the kernel for handling. The kernel also has a trap table, but the kernel's trap table is granted control only if diagnostic monitor 108 decides that it wants the kernel to handle a particular trap. In such case, control will pass to the appropriate offset in the trap table of the kernel to handle the trap. Thus, as far as the kernel is concerned, its own trap table gets the traps that the kernel needs to handle in a transparent manner. Other traps are retained by and handled by monitor trap table 114.

Applications 130, 132, 134, and 136 represent some diagnostic applications that may be executed under kernel 106 to stress specific portions of computer hardware 102. Thus CPU application 130 is designed to emphasize testing of the CPU; memory application 132 is designed to emphasize testing of the memory; and I/O application 134 is designed to emphasize testing of the I/O subsystems. Other applications may be provided to test other subsystems and/or aspects of computer hardware 102 and/or the OS and are represented generically by application 136 in FIG. 1.

FIG. 2 illustrates the diagnostic monitor 108 in greater detail in accordance with one embodiment of the present invention. As can be seen, monitor logic 110 includes, in addition to core monitor codes 214, architecture routines 210 and rules engines 212. Although architecture routines 210 and rules engines 212 are shown separate from monitor logic 110 in FIG. 2 to facilitate discussion, they are in fact part of monitor logic 110. Architecture routines 210 represent routines that may perform standard tasks based on a given architectural level. For instance, the contents of all general registers may need to be saved. This would be done by an architectural routine. The size and number of general registers depends on the particular architecture under consideration (e.g. PARISC 2.0 has 64 bit width registers, while PARISC 1.0 has 32 bit width registers). In one embodiment, although the core monitor is dependent on the architecture, different monitor libraries are provided to accommodate different boxes, thereby enabling the core monitor to be employed for all boxes pertaining to a given architecture.

Monitor trap table 114 is designed to be the functional trap handler during execution. Thus, any trap/interrupt by kernel 106 (see FIG. 1), expected or not, will force it to enter diagnostic monitor 108. This feature allows diagnostic monitor 108 to be made aware of any error traps right away, at which point diagnostic monitor 108 may stop all other processors, and collect any state information. For non-error traps, for example, diagnostic monitor 108 may collect certain statistics (if desired) and then continue on with the basic function of the trap, eventually returning to the kernel.

Diagnostic monitor 108's trap handler is organized in such a way that kernel 106 can specify (for non-error traps) what routine diagnostic monitor 108 should run. This specification should occur during kernel initialization, once the kernel knows there is a diagnostic monitor 108. Otherwise, the kernel may use its default trap handler.

Certain error traps may need to be handled in a special way. For example, for severe hardware errors, significant software errors, and hardware resets, the hardware may automatically branch to firmware routines. In the context of PARISC™ machines, for example, HPMCs (High Priority Machine Checks), LPMCs (Low Priority Machine Checks), and TOCs (Transfer of Controls) may cause the hardware to automatically branch to firmware routines. The firmware may then save the register state of the processor and clear any error conditions. If the appropriate trap handler routine in diagnostic monitor 108 is setup properly, the firmware routine may branch to diagnostic monitor 108's handler. At this point, diagnostic monitor 108 can then begin analysis.

Rules engine 212 of monitor logic 110 includes a set of routines to interrogate monitor library 112 in order to determine how to find the FRU for some error condition. Rules engine 212 is employed to interpret rules 220 (described below), and may also include functionality such as which rules will be employed for error analysis and when error analysis is completed. There may be a library for each type of "box" for a given architecture. The library may contain (among other things) rule functions that may analyze collected data in order to figure out what went wrong. The interface to the rules may be the same across different architectures.

Monitor library 112 includes, in addition to core library codes 224, rules 220 and hardware-specific routines 222. Rules 220 represent rules specific to the box and architecture under consideration and are employed for error analysis. Rules 220 has the inferences for various error conditions and can resolve the error to the failing FRU. Hardware-specific routines 222 include routines specific to a particular box to facilitate, for example, the gathering of any necessary information from the specific box.

Figure 3B:
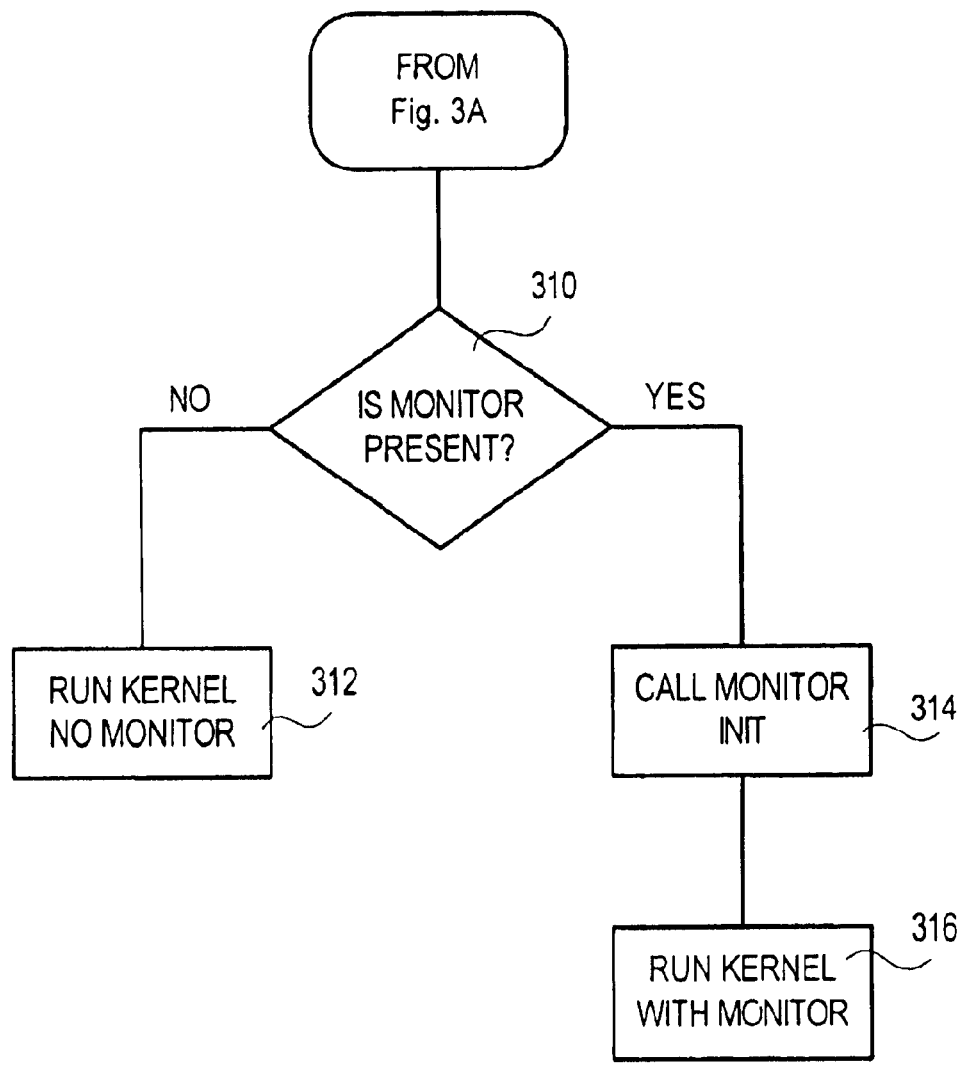

Upon initialization of the computer system, loader module 105 loads the components of diagnostic exerciser 104 in a particular sequence. FIG. 3 illustrates, in accordance with one embodiment of the present invention, the loading sequence upon initialization. In block 302, the loader ascertains whether a diagnostic monitor (such as a binary image of diagnostic monitor 108) is present on the boot device, e.g., a hard disk, a CDROM, or even a particular storage location in a network. If the diagnostic monitor is not present on the boot device, the loader ascertains in block 304 whether the kernel (such as kernel 106) is present on the boot device. If there is no kernel on the boot device, the loading process indicates failure in block 306.

On the other hand, if there is a kernel on the boot device (as ascertained in block 304), the kernel is loaded, and control is passed to the kernel in block 308. In this case, there is no monitor (as determined earlier in block 302) and thus in block 310, the kernel would ascertain that there is no diagnostic monitor present. Note that this check for the presence of a diagnostic monitor is part of the modifications made to the production OS. With no diagnostic monitor present, the kernel executes normally, with the kernel's trap table in control.

If there is a diagnostic monitor on the boot device (as ascertained in block 302), the loader then load, in block 330, monitor logic 110 of diagnostic monitor 108 into memory. Thereafter, monitor logic 110 is initialized in block 332 to, for example, ascertain the box information for the hardware being tested using the associated architectural routines (such as architectural routines 210 of FIG. 2). The box information is then passed to the loader to enable the loader to ascertain, in block 334, whether the requisite monitor library is present on the boot device or another device. If the required monitor library is not present, the process of loading the monitor fails. In that case, the method returns to block 304 to begin loading the kernel, i.e., treating the situation from that point on as if the monitor was not present on the boot device.

On the other hand, if the required monitor library is found (as ascertained in block 334), the required monitor library is loaded in block 336. After the required monitor library is loaded and synchronized for communication with monitor logic 110 (using, for example, dynamic linking technologies), control is passed back to the loader, which then ascertains in block 338 whether the kernel is on the boot device. Note that at this point, the diagnostic monitor is already loaded and initialized. Accordingly, if the kernel is not found (block 338) or if the kernel fails to boot or if there is another problem with the kernel, diagnostic monitor can detect, analyze, and report the error. This is unlike the situation with existing diagnostic tools which run under production OS's. In the case where an existing diagnostic tool runs under a production OS, if the OS fails to get loaded, the diagnostic tool would not have been initialized and would therefore have been of no value in detecting, analyzing, and/or reporting the error.

If the kernel is not found in block 338, the loading process reports failure in block 306 since there can be no application execution under the OS if the kernel cannot be found. On the other hand, if the kernel is found, the kernel symbol table is loaded in block 340. Generally speaking, the symbol table provides addresses of important elements (such as data structures and subroutines) of the kernel. The diagnostic monitor relies on the kernel symbol table, which is embedded in a non-stripped version of the kernel binaries. Thus, in one embodiment, the loader obtains the symbol table from the kernel ELF binary and loads the symbol table into memory.

One the symbol table is loaded in block 340, the kernel is loaded in block 308. The kernel is preferably loaded into a fixed address in memory. In block 310, the kernel ascertains whether the monitor is present. In one embodiment, the information regarding the presence of the monitor is passed from the loader to the kernel. If the diagnostic monitor is not deemed present for whatever reason (as ascertained in block 310) the kernel executes normally in block 312 with its trap table in control. On the other hand, the diagnostic monitor is present (as ascertained in block 310), the kernel may optionally call upon the diagnostic monitor (in block 314) to, for example, ascertain which traps are handled by the diagnostic monitor's trap table and which traps are handled by the kernel's trap table. Of course the decision pertaining to which traps are handled the kernel and which traps are handled by the diagnostic monitor may be worked out in advance and hard-coded. In such a case, optional step 314 may be omitted.

Once the kernel completes initialization with the diagnostic monitor, the kernel runs with the diagnostic monitor, and the monitor table in control (block 316).

Figure 4A:
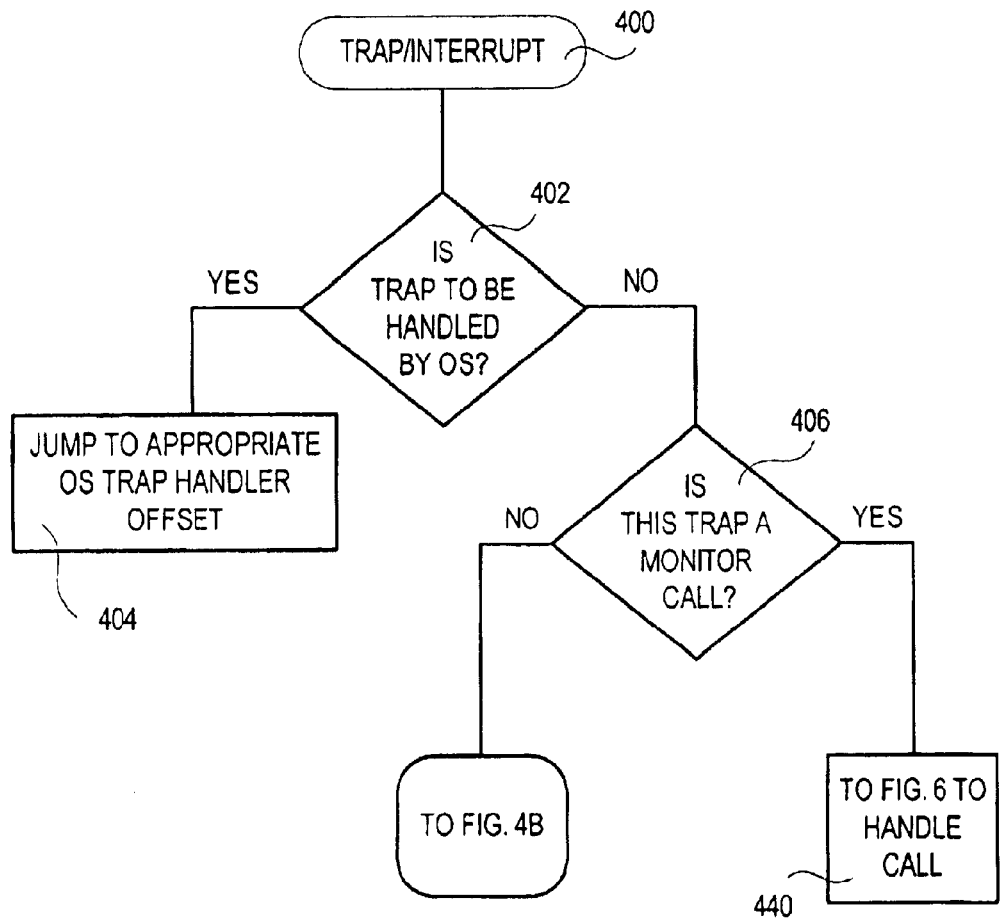
FIGS. 4A and 4B illustrate, in accordance with one embodiment of the present invention, the logic flow for diagnosing the performance of a computer system by the diagnostic monitor.

FIG. 4 illustrates, in accordance with one embodiment of the present invention, the error handling steps by the diagnostic monitor. Because a trap could be a result of normal operation or it could represent a problem, the diagnostic monitor needs to examine traps and make certain decisions regarding how the traps are handled. In block 402, the diagnostic monitor ascertains whether the trap is to be handled by the kernel or by the diagnostic monitor itself. In one embodiment, the decision is made using a bit masking technique for looking at the bit in a particular position of the variable. Other techniques may also be employed, including the use of arrays.

If the trap is a result of normal operation, such as a page miss, such trap may be handled by the OS's kernel. In that case, the method proceeds to block 404 wherein it branches to the appropriate OS trap table offset using the symbol table loaded earlier (e.g., in block 340 of FIG. 3) and/or the information obtained during diagnostic initialization call by the kernel (e.g., in block 314).

For example, in the PARISC™ implementation, branching can be performed by, for example, using a relative branch instruction (e.g., branch to five instructions away) or by giving the actual address to branch to in the branch instruction. Alternatively, branching may be accomplished by reference to a general register, which contains the address.

However, for Itanium-based systems, if a branch instruction employs a branch register, there is a potential for inadvertently overwriting the content of a branch register that is in use by the kernel since the kernel also employs branch registers. It is possible to force the kernel to temporarily store and restore the values of these registers but that may involve certain additional modifications to the production kernel.

To keep the number of changes to the kernel low, there is provided, in accordance with one embodiment of the present invention, a branch table within the diagnostic monitor. With reference to the IPF™ implementation, for example, the branch table is initially setup so that all branches jump to themselves. During initialization, the monitor can dynamically calculate the address of the long branch instructions and can alter all the branches of the branch table to branch to the appropriate offset in the kernel trap table. This is possible because the kernel trap table resides at a fixed address.

To clarify, a long branch is a type of relative branch that allows one to branch to a long offset, typically longer than normally performed using a normal relative branch. Using long branches allows the monitor to be positioned at any desired location in memory, and still be able to get to the kernel trap handler. Otherwise, the monitor would have to reside near the kernels trap handler in memory. Furthermore, the monitor long branch table renders it possible to avoid using the branch registers, which are utilized by the kernel. Thus, it is not necessary to keep track of the contents of the branch registers, which would require more kernel modification. For implementations that do not involve branch registers, for example PARISC™, general registers may be employed instead.

Returning to FIG. 4, if the trap is to be handled by the diagnostic monitor (as ascertained in block 402), a decision is made in block 406 whereby the diagnostic monitor ascertains whether the trap is an explicit monitor call by the kernel. By way of example, the immediate values associated with break trap instructions, which are employed to monitor calls, may be specified to allow the diagnostic monitor to ascertain whether a trap is an explicit monitor call by the kernel. If the trap is an explicit monitor call, it is handled in block 440, which is discussed in connection with FIG. 6 hereinbelow.

Figure 4B:
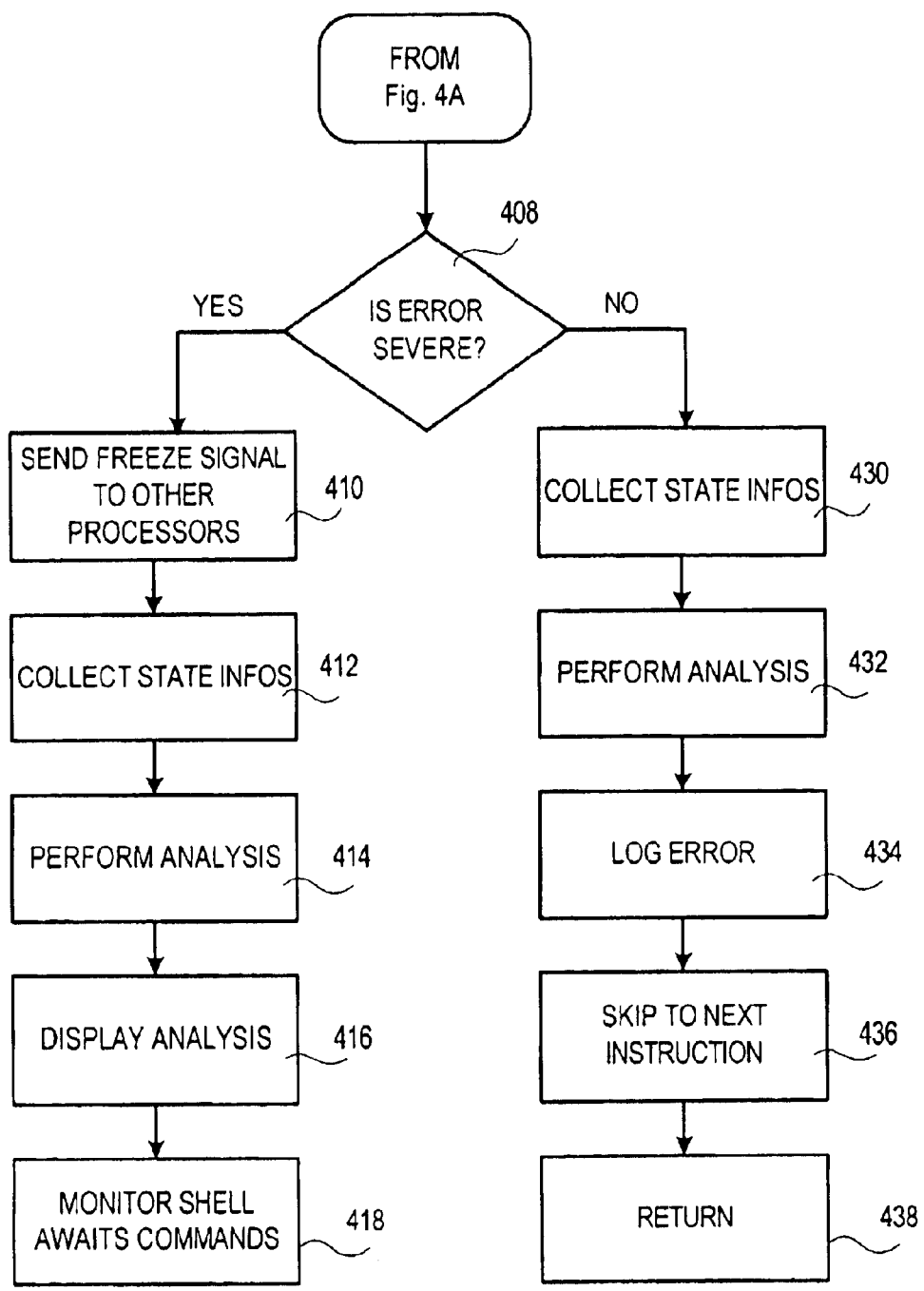

If the trap is not an explicit monitor call (as determined in block 406), the hardware-triggered error is assessed in block 408 of FIG. 4B to determine whether the error is severe. As an example, the failure of kernel boot is a severe error. In IPF™, for example, the occurrence of a Machine Check Abort (MCA) condition is typically regarded as a severe error. In PARISC™, for example, the occurrence of a High Priority Machine Check (HPMC) condition is typically regarded as a severe error. Generally speaking, each architecture has its own way of representing a severe error. However, details on the error can vary between different box types. For example, there may be one bit in a given hardware register in the processor which will be set if the error is severe. The fact that the diagnostic monitor has direct access to the computer hardware facilitates the assessment in block 408. Generally speaking, the error details may be ascertained using the rules.

If the error is deemed severe (as ascertained in block 408), the diagnostic monitor then stops the kernel from running by sending an interrupt signal to all other processors (assuming there are multiple processors). It is possible, for example, for one processor to experience a severe error (e.g., a HPMC in the case of PARISC™) but other processors of the computer system may not have experienced the same severe error. Freezing the processors by an external interrupt signal allows the state of the processors to be collected in block 412 to facilitate analysis in block 414. Of course if there is only one processor in the system, there is no need to send the interrupt signal to the non-existent other processors, in which case block 410 is not necessary.

In block 414, the error analysis may be accomplished using, for example, the hardware-specific routines (222 in FIG. 2) of the monitor library. The hardware-specific routines may examine various registers of the processors, the I/O registers, certain data structures in the kernel, and the like, to ascertain the error and/or the cause thereof. The analysis result is displayed in block 416. In one embodiment, the result may be displayed in a monitor shell that is separate from the OS's shell. The monitor shell permits certain diagnostic-related inputs and outputs and can continue to run even if the OS crashes. For example, one can employ the monitor shell to specify certain kernel data structures and routines and causing those to be displayed for examination. This is represented in block 418 of FIG. 4.

On the other hand, if the error is not deemed severe (by block 408), the state information pertaining to the error can be collected in block 430. In block 432, analysis is performed using the rules and hardware-specific routines of the library to narrow the error down to one or more FRUs (Field Replaceable Unit). For example, if a single bit error is encountered, block 432 may attempt to narrow the error down to a single DIMM and/or a single memory slot.

Note that the rules and rules engine of the monitor allow it to analyze the relevant (box specific, in some cases) registers and data structures of the kernel (if necessary) and to narrow the problem to, for example, the failing FRU. This is in contrast to the prior art situation employing a standard OS, wherein an experienced user or expert would have to manually analyze the data dumped by the kernel. Furthermore, the monitor has access to all system and kernel data, thereby ensuring that the monitor can obtain any required information in order to accurately perform the error detection and error analysis tasks. In contrast, the data dump by the kernel may not, in some cases, contain all the required data for error analysis.

The information pertaining to the error is logged in block 434. The logged errors may be retrieved by an application program at a later point in time (e.g., for further analysis or display) using a monitor call. In block 436, since the error is non-severe, the method preferably skips to the next instruction and returns to the caller to allow execution to continue. Advantageously, this approach minimizes manual intervention by the user since non-severe errors are automatically logged and execution can simply continue. In contrast, prior art diagnostic techniques tend to be more intrusive and require users to manually resume after each error is encountered. Of course, if manual intervention is desirable, such can also be implemented.

Figure 5:
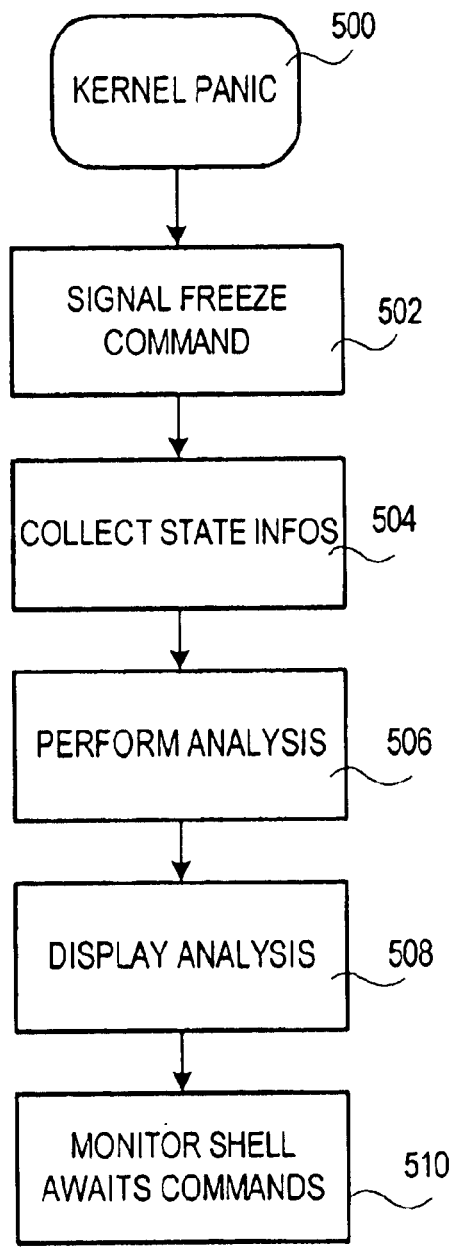
FIG. 5 illustrates, in accordance with one embodiment of the present invention, the steps for handling a kernel panic.

There are times when kernel panics occur without traps. For example, the kernel may have encountered some illegal situation where it runs out of resources (e.g., memory) or experiences a problem that it cannot resolve (e.g., an unresolvable page fault). In this case, the kernel may have made a panic call, which is converted into a monitor call by the non-production kernel to allow the diagnostic monitor to become involved. The kernel panic-related monitor call however contains information identifying the monitor call as one that results from a kernel panic. Once the panic-related monitor call is received, it is handled in blocks 502–510 of FIG. 5.

Blocks 502–510 perform error handling in an analogous fashion to that performed by blocks 410–418 of FIG. 4.

Figure 6:
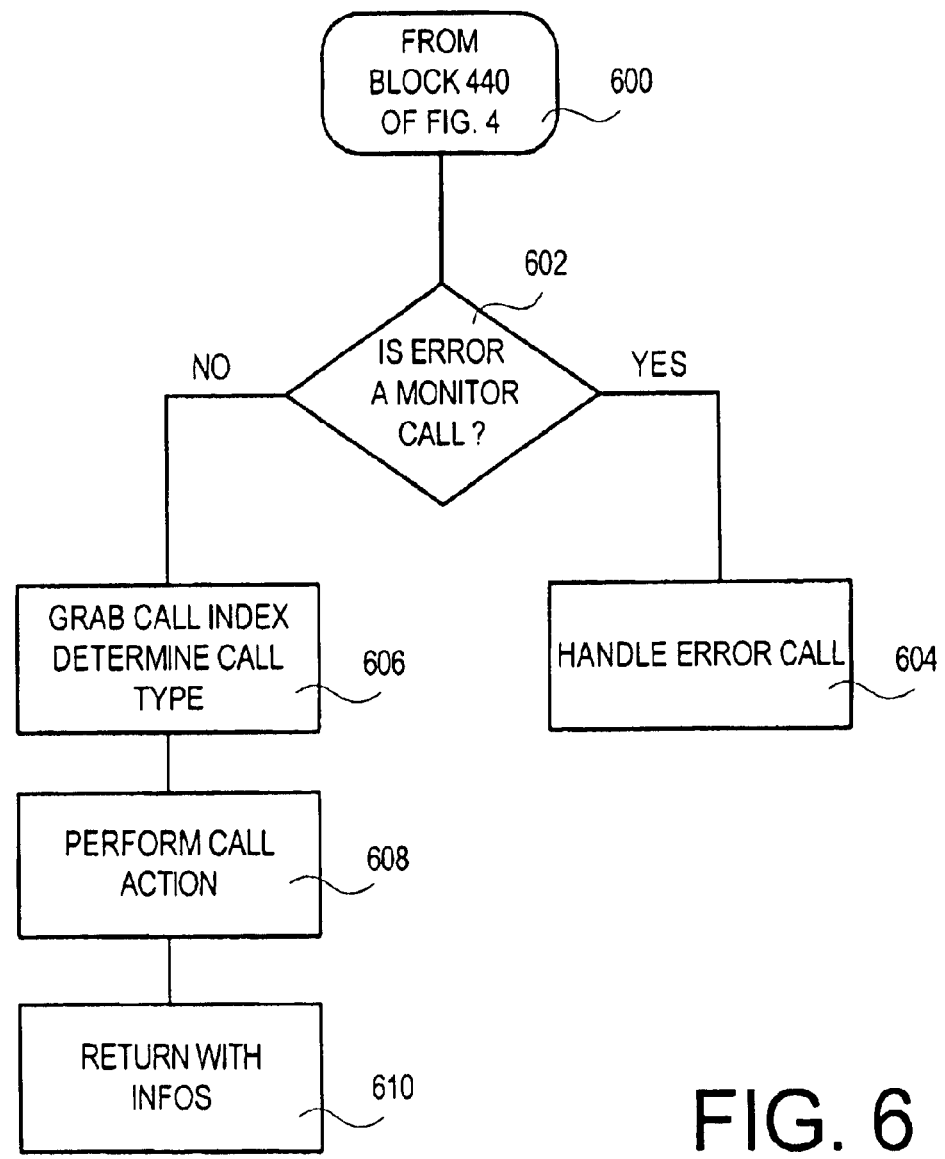
FIG. 6 illustrates, in accordance with one embodiment of the present invention, the steps for handling a monitor call by a diagnostic application.

FIG. 6 shows, in accordance with one embodiment of the present invention, block 440 of FIG. 4 in greater detail. In this case, the monitor call is neither occasioned by the hardware nor caused by a kernel panic. Rather, an application has made a monitor call to report an error or, for example, to inquire about errors. Thus, in block 602, the diagnostic monitor determines whether the monitor call is simply a normal monitor call or a monitor error call, i.e., the application has already determined that there is an error. An error monitor call may be made if, for example, the application has determined that the ECC (Error Correcting Code) circuitry is defective. If the monitor call is an error monitor call, the method proceeds to block 604 wherein the error monitor call is handled in a subsequent FIG. 7, which is discussed later herein.

On the other hand, if the monitor call is not an error monitor call, the method proceeds to block 606 wherein the diagnostic monitor ascertains the nature of non-error monitor call received. In one embodiment, this is accomplished by consulting the call index in a table. An example of such a non-error monitor call made by the application may involve a call to determine the number of processors in the system, or a call to determine if any correctable errors had occurred.

Once the diagnostic monitor ascertains the nature of the non-error monitor call received, the action requested in the non-error monitor call is performed in block 608. In block 610, the information requested in the non-error monitor call, if any, is returned to the calling application.

Figure 7:
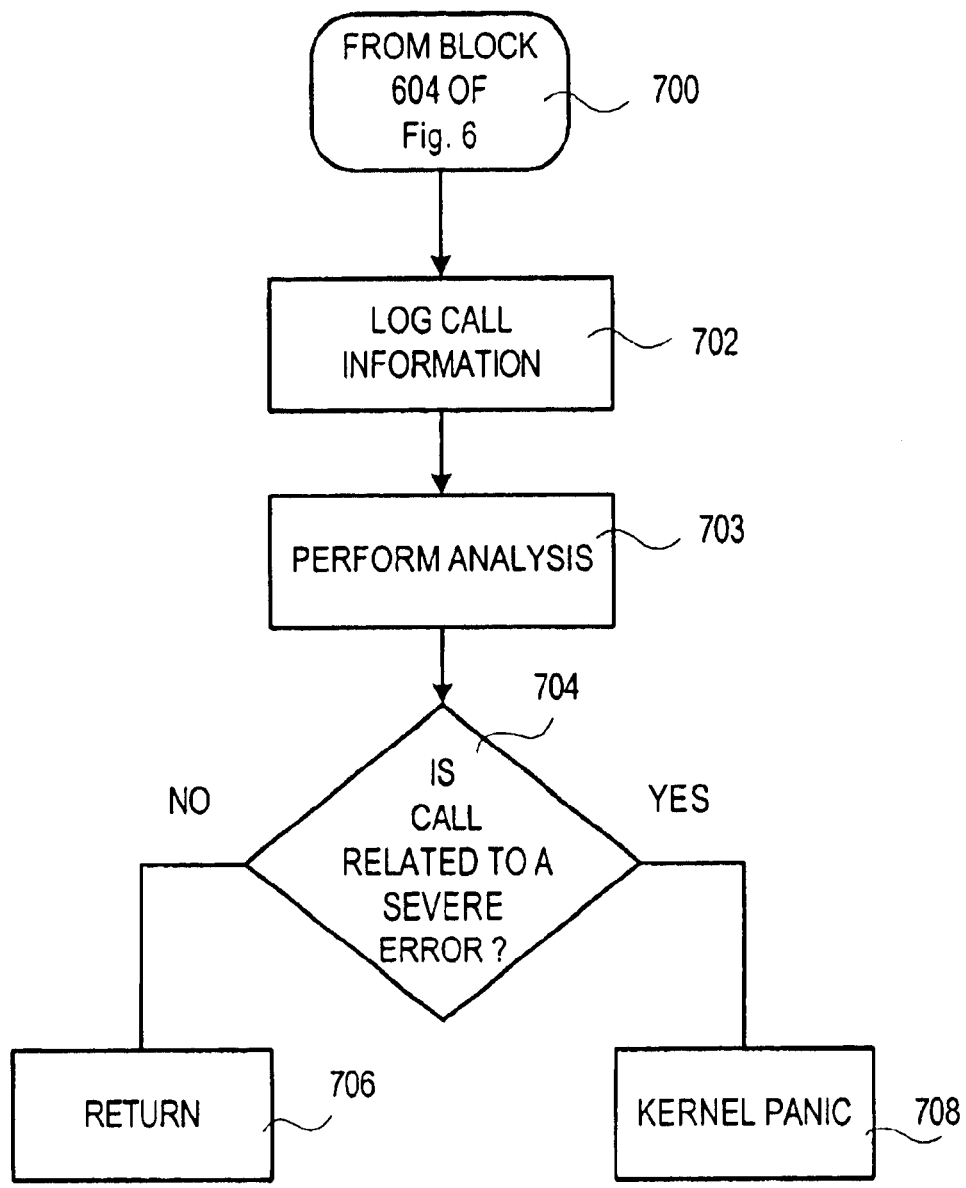
FIG. 7 illustrates, in accordance with one embodiment of the present invention, the steps for handling an error call by a diagnostic application.

FIG. 7 shows, in accordance with one embodiment of the present invention, block 604 of FIG. 6 in greater detail. In FIG. 7, an error monitor call has been received, which is different from the hardware generated trap handled by FIG. 4. In this case, the application has determined that there is an error with the hardware, and the diagnostic monitor proceeds to collect data and perform error analysis to validate the reported error monitor call. Thus, in block 702 the diagnostic monitor will log the received error monitor call, along with any data furnished by the application. In block 703, the error monitor is analyzed using, for example, the rule-based analysis. In block 704, the diagnostic monitor will ascertain whether the error monitor call relates to a severe error. A HPMC (PARISC™) or a MCA (IPF™) represents an example of a severe error that causes explicit types of traps. An example of a severe, non-trapping type of error may be, for example, a semaphore timeout. In a semaphore timeout, some processor has grabbed the semaphore for longer than some certain threshold, which situation indicates an imminent hang. In this case, the semaphore may timeout, for example, and result in a call to the monitor.

If the error monitor call is deemed severe in block 704, the diagnostic monitor would treat the severe error monitor call in the same manner that it treats kernel panics. Thus, the method proceeds to block 708 wherein the severe error monitor call is handled in the manner discussed earlier in connection with FIG. 5.

On the other hand, if the error monitor call relates to a non-severe error, the method proceeds to block 706 to return to the calling routine (since the error monitor call has already been logged in block 702) to continue execution.

As can be appreciated from the foregoing, the inventive diagnostic exerciser combines the best of the off-line diagnostic exerciser approach with the best of the on-line diagnostic exerciser approach. By using a non-production kernel, limitations imposed by production OS are effectively removed, allowing the inventive diagnostic exerciser to have more direct access to the computer hardware and information that would have been otherwise unobtainable from a production kernel. This enhanced access to the computer hardware and kernel data structures and subroutines enhances the error detection and error analysis capabilities of the inventive diagnostic exerciser. However, the use of a non-production OS that has minimal difference from the production OS (with the difference being those made to accommodate the diagnostic monitor), the inventive diagnostic exerciser can stress the computer hardware more fully, accommodate more directed tests with appropriately designed applications (which can substantially reduce the required diagnostic testing time) as well as accommodate tests that are more reflective of the way the computer hardware may be used in the field.

Furthermore, the provision of a diagnostic monitor that runs in cooperation with, instead of under, the non-production OS enables the diagnostic monitor to be able to monitor the kernel failure and to capture information pertaining to kernel failures for analysis. Since the diagnostic monitor is loaded before the loading of the non-production kernel, diagnostic is possible even if the kernel fails during loading. If an error occurs, the provision of a rule-based analysis system facilitates the analysis and display of error and/or source thereof in an easy-to-understand manner.

Exemplary Implementation

In the example discussed below, an exemplary implementation of a diagnostic exerciser based on the Linux operating system is discussed. It should be kept in mind that the exemplary implementation of Appendix A is but one implementation of the invention, and design choices, assumptions, and limitations suggested for this particular implementation should not be construed in a blanket manner to be limitations of the invention, which are clearly defined by the claims herein.

In the exemplary implementation below, Rage is the name given for non-production kernel and Ragemon is the name given for the diagnostic monitor.

Introduction

Functionality/Features

RAGE is offline exerciser based on LINUX. It is designed, to be instrumented in such a way as to allow it to be monitored by a separate executable. The applications that run under RAGE are designed to stress the hardware, as well as perform some diagnostic capabilities. RAGEMON is the executable designed to monitor RAGE. Both RAGE and the Monitor are loaded into memory by a loader ELILO. Which is a modified version of the standard LINUX loader.

Rage intends to implement the following features:

To extend the coverage of our traditional "point to point" tests.

To better capture transient errors by generating more stress patterns.

To have the ability to detect and recover from hardware errors (i.e. MCAs).

To have the ability to isolate hardware errors to a FRU or at least a small list of FRUs.

The target platform is Orca

The following list of features would also be desirable to have in the Offline exerciser:

Test suites that cover all the major hardware elements.

The ability to add "point to point" tests directed at a specific hardware target.

Platform portability.

The ability to specify what stress tests suites should run and on what targets.

Fast loading with a small initial footprint.

Monitor is still alive if kernel crashes.

Dependencies

In general RAGE has the following dependencies:

The most obvious dependency is of course the LINUX kernel itself.

EFI Runtime services

Firmware, PAL & SAL calls

Appropriate compilers

Assumptions

It is assumed that the LINUX kernel will have support for Orca (can boot, and run, etc.)

Design Overview

Design Context

Initially, RAGE can be used in the offline environment after running the ODE based diagnostics. After RAGE is tuned, it can eventually replace many of the standard offline diagnostics, just leaving a core set of ODE based tests. This small core set of tests would primarily focus on the CPU for cache pattern tests and TLB functionality. Then, RAGE can be launched to stress test the rest of the system. Eventually, RAGE should be able to replace the standard online testing as well. The final desired scenario would be: 1) core ODE tests; 2) RAGE tests.

Overview Of Operation

The diagram of FIG. A1 shows the basic modules that make up the RAGE exerciser platform.

As the diagram illustrates, RAGE is made up of 3 components: the Kernel, the Monitor, and the RAGE applications. Note that the kernel and Monitor are at the same level. The RAGE Monitor does not run under the kernel, but rather with the kernel. The RAGE applications run under the kernel, as one would expect. And they actually perform the hardware stress. The applications are analogous to the ODE diagnostics under the ODE platform.

Major Modules

The following sections give a more detailed explanation of the Major RAGE modules.

Loader

The basic functionality of the loader is shown in the diagram of FIG. A2.

The kernel loader will be responsible for loading all the Rage modules into memory. The first module it will load will be the Monitor. Once loaded, the Monitor will do some initialization (number 1 in FIG. A2), and then determine what hardware it is running on. Based on that information, the Monitor will inform the loader which Library to load.

The library is a "box version" specific module that contains specialized information, such as how to grab the contents of certain diagnose registers. The Monitor itself, is only architecturally specific. The Libraries should be viewed as a collection of special routines for the particular type of box we are running on. Once the proper library is loaded, it will initialize with the Monitor (number 2 in FIG. A2). Initialization would include such things as, letting the Monitor know where the library entry point is.

Once the Library is loaded, the Loader will load the RAGE kernel. The loader will pass the address of the Monitor's trap handler to the kernel. If there is no Monitor present on the boot device, the loader will pass zero as the address of the RAGE Monitor's trap handler. In this way, the kernel will know whether to use its own internal trap handler, or the Monitor's. If the Monitor's trap handler address is non-zero, the kernel will assume that a Monitor is present (see number 3 in FIG. A2).

Monitor

RAGEMON's job is to determine what went wrong with the kernel when an error occurs, and to attempt to isolate the problem to a FRU (or at least an ordered list of FRUs) for replacement. To do this, RAGEMON will have information from the kernel. For example, RAGEMON will want to know what range of memory is actually occupied by the kernel, as opposed to memory being available to processes. When the kernel first comes up and detects that a Monitor is present, it will initialize with the Monitor to pass certain important information. RAGEMON (if available) will be present while the kernel is running, and even while the kernel is booting. The kernel will always be loaded at a fixed address (pre-determined).

As can be seen from the figure of FIG. A3, the Monitor has several major areas that it is composed of. Architecture routines are routines that will perform standard tasks based on a given architectural level. For instance, the contents of all general registers will need to be saved. This will be done by an architectural routine. The size and number of general registers depends on the particular architecture one is using (e.g. PARISC 2.0 has 64 bit width registers, while PARISC 1.0 has 32 bit width registers). Note that the Monitor itself is also architecturally dependent. Thus, the Monitor for a PARISC 2.0 machine, will be different than one for an IA-64 machine. However, the basic functionality of the routines within each Monitor would be the same.

The trap handler within the Monitor is designed to be the functional trap handler while the RAGE kernel is running. Thus, any trap/interrupt by the kernel, expected or not, will force it to enter the Monitor. This feature allows the Monitor to be made aware of any error traps right away. At which point, the Monitor can stop all other processors, and collect any state information. For non-error traps, the Monitor could collect certain statistics (if desired) and then, continue on, with the basic function of the trap, eventually returning to the kernel. The Monitor will know the location of the kernel's trap handler from the kernel symbol table, so that it can branch to the appropriate offset in the kernel trap table. Otherwise, the kernel will use its' default trap handler. Certain error traps need to be handled in a special way. For MCAs, and CMCs, the hardware will automatically branch to firmware routines. The firmware will then save the register state of the processor and clear any error conditions. If the appropriate trap handler routine in the Monitor is setup properly, and if the firmware deems the error not severe enough to require a reboot, the firmware routine will branch to the Monitor's handler. At this point, the Monitor can then begin analysis.

The rules engine of the Monitor is basically a set of routines that allows it to interrogate the Library in order to determine how to find the FRU for some error condition. There will be a library for each type of "box" for a given architecture. The library will contain (among other things) rule functions that will analyze collected data in order to figure out what wrong. The interface to the rules will be the same regardless of architecture.

The Monitor will have its own separate shell. The primary purpose of this shell is to display the Monitor's analysis to the user, and to allow the user to view certain state information. Thus, the Monitor's shell will be very simple, without many of the features found in the kernel's shell. It is expected that a novice user would simply look at the Monitor's FRU or FRU list, and act accordingly, without any Monitor shell interaction. But, expert users may wish to view more detailed information about the failure state, and perhaps the Monitors decision process.

Kernel

The kernel will have to be modified primarily to allow the applications to do a better job at diagnosing. The goal, however, is to minimize the modifications as much as possible. The following list shows the areas of the kernel that will need to be modified:

Initialization (for the Monitor)

Initialization (for Drivers)

Monitor interface changes (see kernel interfaces section below)

New diagnostic capability

Processor Affinity (if it does not already exist)

Physical Memory Allocation

Major Interfaces

There are 2 groups of interfaces that are to be considered in this document:

External Monitor interfaces (Monitor/Kernel and Monitor/Application)

Internal Monitor interfaces

Kernel/Application interfaces

External Monitor Interfaces

There will be four basic ways in which the Monitor, (RAGEMON) can be accessed from the kernel:

1) Traps/Interrupts

2) Kernel Panics

3) Explicit Monitor calls

4) Explicit Monitor error calls.

The following sections give more detail on each one of the access methods. Note, that for all the methods, the Monitor will be in real mode, with most traps, disabled.

Traps/Interrupts

At various times, while the kernel is running, it may encounter a trap, fault, interrupt, or check. Not all of these conditions indicate an error condition. However, any such condition will cause the kernel to enter the Monitor. This is because the kernel's trap handler will point to the Monitor's handler. This will ensure that the Monitor will capture any of these significant trapping conditions. In the case of multiple processors, the Monitor will either, have to provide a separate handler for each processor, or use semaphores to keep the processors from overwriting any critical pieces of Monitor code. In both cases, the Monitor will have to know how many processors there are.

During initialization, the kernel will have to inform the Monitor of the addresses of the routines, which handle the non-error cases. When one of these non-error traps occurs the Monitor will then branch to the appropriate routine, in such a way as to not alter the register state for the kernel.

Kernel Panics

Kernel panics generally occur when the kernel encounters some illegal situation, or when it cannot resolve some problem (e.g. page fault that can't be resolved). Kernel panics could result from software errors or hardware errors. The Monitor needs to know when they occur, so that it can make the distinction. All "Panic" calls in the kernel will be implemented using a variant of the break instruction (e.g. break 2). This will force the kernel into the Monitor, where the Monitor can determine the appropriate action for the panic.

Monitor Calls

During initialization, the kernel will need to pass information to, and perhaps get information from the Monitor. This type of kernel/Monitor communication is not related to errors. For these types of calls, the Monitor will not need to determine error conditions or try to freeze the kernel. Since the Monitor will be entered for any trapping condition, we can use another break instruction variant for a standard monitor call (e.g. break 3).

Monitor Error Calls

There will be cases where an application detects a hardware error condition directly. The application can use a system call to inform the kernel. The kernel, in turn, can let the Monitor know via a Monitor error call. Unlike a standard Monitor call, the error call would indicate that the Monitor should freeze the kernel, collect error information, and begin fault analysis. Again, the use of a break variant would be convenient (e.g. break 3) in keeping a consistent interface to the Monitor. It may be better to allow applications to directly invoke these calls, so that the Monitor can gather "fresh" information about the error. Break instructions allow the Monitor to have the closest "snap-shot" of the register state, of an error event. Note that the break instruction takes an immediate field. This field will be use to distinguish between different types of Monitor calls.

Monitor Freeze Calls

When the Monitor has been informed of an error condition, it will need to "freeze" the kernel. "Freezing" essentially means stopping all kernel processes. This feature is useful to fault analysis, for the case where one process interfered with another. The process that was interfered with could cause a trap. In which case, it would be useful to have information about the process that interfered with the trapping one. The more information one could get about the interfering process, at the time the trap occurred, the more useful that information would be.

On a single processor system, the kernel is essentially "frozen" when a process traps to the Monitor. This is because no other processes can run, since there's only one CPU, hence one thread. But, for multiple processor systems (MP systems), the other processors will have to be stopped. To accomplish this, the Monitor could issue a "Transfer Of Control" (TOC or reset command), to force all processors to a known place. The TOC would effectively "freeze" the kernel.

The Freeze call would be the only call, describe so far, where the Monitor is initiating communication to the kernel, rather than the other way around. For MP systems, it would be useful if the Monitor could switch to a non-trapping processor, in case the trapping one was severely malfunctional.

By default, if an MCA, or CMC is encountered, firmware will take over before returning to the Monitor. Firmware will then force all processors to collect state, and "rendezvous", before returning to the Monitor on the PD Monarch processor. For other errors, where no firmware intervention is involved, the Monitor will have to issue a special external interrupt itself (via library routines) to "freeze" the other processors.

Internal Monitor Interfaces

Unlike the Monitor/kernel interface, communication between the Library and the Monitor will occur through procedure calls. And, since the Library and Monitor are separate executables, there has to be some sort of stubbing mechanism between the two, in order for communication to occur. Recall that the Library is a "box" specific module that can change when RAGE is run on different boxes. Therefore, there will need to be some sort of standard interface between the Monitor and the library, so that the Monitor will not have to know which library is present. There will be a standard set of calls that the Monitor can make to the library, which will allow the Monitor to get the information it needs regardless of which "box" the library is written for.

The library has several functions that it has to perform for the Monitor. These functions can be broken down into several areas: Initialization, Error recovery, Error collection, and Fault analysis. On start-up, the loader (Rageldr) will load the Monitor first. Then, the appropriate library module will be loaded. The loader will pass the library module the address of the Monitor's caller entry point. The loader will pass control to the library module so it can initialize with the Monitor. Once that initialization is completed, control will pass back to the loader so that it can load the kernel.

The Monitor and the Library will communicate via a "stub" interface. There will be a standard set of index numbers that represent calls. The library will have stubs that specify the index of the desired call. The Monitor will have similar stubs so that the library and Monitor can communicate with each other, with either as the initiator.

Note, all Monitor functions will start with the prefix "Mon_", while all library functions will start with the prefix "Lib_".

Initiatilization Functions

When the loader first loads the library, and temporarily passes control to it, the library will need to pass its caller entry point address to the Monitor. The loader will have passed the Monitor's caller entry point to the library. Thus, the library can call the Mon_Init( )function to pass its caller entry point to the Monitor. This call will also informed the Monitor weather to use the default "firmware intervention" method for severe errors, or the "back door" method.

The Lib_Chksum function does an additive checksum over the entire body of the library. This function is design to ensure that the library has been loaded into memory properly. The checksum result should be zero. Thus, the return of this function should be zero.

The Mon_Chksum( )function is similar to the Lib_Chksum( ) function, except it allows the Monitor to ensure that it was loaded into memory properly.

The Mon_ProcCnt( )function can be called by the library once kernel initialization is completed. This function will return the total number of processors detected by the kernel. If this function is called before the kernel initializes with the Monitor, or if the kernel fails during initialization, this function will return 0.

Error Recovery Functions

The Mon_Grs(proc_id)function will return the general register state of the specified processor, at the time it last entered the Monitor, or at the time of the error (if the Monitor sensed an error condition). This function takes the processor ID as an argument. Whenever a processor enters the Monitor, its register state will be saved. When a processor re-enters the Monitor, the saved register state will be overwritten. The library routines can use this function to get the last known state of a processor. For error conditions, this routine will get the register state from firmware, if the default firmware intervention method is being used. For "back door" libraries, the Monitor will rely on a special LIB_GRs(proc_id) routine to get this information.

The Mon_Crs(proc_id) function is similar to Mon_Grs, but it returns the architectured control register state.

The Mon_Shutdown( ) function allow the Monitor to do any necessary clean up before the kernel stops running, and returns to the loader. The Monitor will clear any run flags in NVRAM when this function is invoked.

The Lib_Spec(index) function allows the Monitor to call non-standard library functions.

The Lib_Rcv(trap_id) function is called by the Monitor whenever a trap has occurred, and the register state has been saved. This library function will "recover" the trap so that the processor can still run. For HPMCs and LPMCs, if the default "firmware intervention" method is used, this function will do nothing.

Otherwise, this routine will save away any hardware specific error registers that it plans to alter. For most traps, this routine will effectively be a "no-op", but for traps deemed severe by the library, this routine will do the necessary saving and "clean-up".

The Lib_Freeze( )function is called by the Monitor when the Monitor wants to stop all kernel processes and record the kernel state. Since doing this could vary from box to box, this routine allows details to be abstracted from the Monitor. By default, for nay error other than HPMCs and LPMCs, this function will invoke a TOC.

The Lib_SwitchProc(proc_id) function allows the Monitor to start executing on the specified processor. Certain error conditions might make the processor, that the Monitor is currently running on, unstable. In such cases, if the system is a multi-processor system, it would be advantageous to have the Monitor switch to a more stable processor.

The Lib_ProcID( )function allows the Monitor to obtain the processor ID of the currently running processor.

Error Collection Functions

The Lib_Collct( )function is called by the Monitor once it determines that an error condition has occurred on the currently running processor. This routine will collect all register and other information that the Monitor does not collect by default. This function masks the Monitor from having to know about any "box" specific registers whose state needs collecting. By default, for HPMCs and LPMCs, this function will make firmware calls to obtain certain error information.

Fault Analysis

The LIB_FaultAnal( )function is the central function involved in fault analysis. The Monitor will call this function once all the information is collected for all processes. This function points to the rules list that the Monitor will process to determine the failing FRU.

The Mon_Printf( . . . ) function allows the Monitor to print to the console. It has the same parameter signature as a standard printf call.

The Mon_KernelSym(address) function will return the name of the kernel function that contains the specified address.

Kernel Interfaces

There are several changes to the standard kernel that will have to be made, in order to allow the Monitor to do its job:

1) Monitor Initialization
2) Heartbeat Functionality
3) Timed Semaphores
4) Explicit Monitor calls
5) Driver Modification These kernel modifications will need to be made in such a way so that if the Monitor is not present, no Monitor contact will be attempted. When the loader launches the kernel, it will pass the Monitor's trap handler address, if the Monitor is present. Otherwise, a zero will be passed. In this way, the Kernel will know whether the Monitor is available.

Monitor Initialization

When the Rage kernel begins to boot, if it detects the Monitor's presence, it will need to initialize with the Monitor. Initialization involves specifying to the Monitor certain kernel specifics, such as the following:

1) The Kernel Symbol Table

When the loader loads the kernel, it will also load the kernel symbol table. A pointer to this table will be given to the Monitor so that the Monitor will have access to all of the kernel's global addresses. This allows the Monitor to analyze the kernel, even when it fails to come up.

2) The Kernel Routines for Specific Types of Traps

The kernel will specify to the Monitor all the traps it wants to handle itself. The kernel will have to pass the address of the routines its whishes called upon encountering certain traps. The Monitor will save the addresses, so that when a trap occurs, the Monitor will call the appropriate, pre-assigned routine.

3) The Kernel Start of Free Memory

If the Monitor knows the kernel's start of free memory, it can determine whether certain errors are related to compile time data structures or data structures that were created at run-time. In addition to the start of free memory, it would be useful for the Monitor to know the location of certain run-time structures (e.g. the map structures of the page allocator).

4) The Number of Processors

The Monitor obviously needs to know the number of processors. This is important, for instance, when the Monitor is freezing. It will need to know when all of the processors have checked in. Also, there are cases where the Monitor may want to switch processors to avoid hardware problems on the first trapping processors. The Monitor would like to know the state of all processes that were running at the time the failure occurred. Since every processor can be running a process, all running processors must be known. The Monitor could determine the number of processors itself, but since this has to be done by the kernel, why duplicate the code in the Monitor? Therefore, the Monitor will rely on the kernel for this information.

Heartbeat Functionality

Certain error conditions could cause the kernel to get stuck in some kind of infinite loop. On normal operating systems, these kinds of errors are difficult to diagnose. Ideally, it would be useful for the kernel to periodically "check-in" with the Monitor so that the Monitor can detect a hanging condition. The "Heartbeat" functionality of the Monitor is designed for precisely this situation. The implementation of the heartbeat functionality is more difficult on a uni-processor system than a multi-processor one.

Due to the periodic nature of the heartbeat function, the interval timer interrupt is the likely candidate for the "heartbeat" function. Every time a processor has a timer interrupt, the Monitor will be called. The Monitor can then check how many interval timer ticks have passed since the last interrupt. If more than, say three, time slices have passed, the Monitor would consider this a potential error condition (Note, that the exact number of time slices to be considered as an error will be determined heuristically, based on the kernel behavior). The Monitor would look at the address queues (as directed by the rules from the library) to see if the kernel was executing in the same general vicinity as it was during the last timer interrupt. If so, this would cause the Monitor to freeze the system and indicate a kernel hang. The Monitor would then try to further analyze the hang (i.e. find out what routine was hanging, etc.).

On a multi-processor system, it is unlikely that all the processors will hang at the same time. Therefore, some processor will enter the Monitor, sooner or later. At that point, the Monitor can check on the processor that had the timer interrupt, as well as the other processors. If the interval timers of all processors have been synchronized (this can be done via diagnose instructions) then, the Monitor can determine whether some other processor has taken too long to "check-in" with the Monitor. Due to the passive nature of the Monitor, a uni-processor system could hang and be undetected by the Monitor. If the infinite loop that the kernel is in, has the interval timer interrupt turned off, and no other types of traps occur within the loop, the Monitor will not be called!

Timed Semaphores

Semaphore functions are prime examples of code where the kernel could hang, without any interrupts. Such a hang would be especially dangerous on a uni-processor system since the Monitor would never be called! In order to reduce this possibility, all semaphore functions in the kernel should be timed. In other words, the all semaphore functions should only try to access a semaphore for a fixed amount of time. Once that time elapses, the semaphore function should call the Monitor.

Explicit Monitor Calls

The kernel can call the Monitor directly using an explicit Monitor call. As previously mentioned, the kernel will call the Monitor during initialization. However, there are many situations where the kernel may want the Monitor to track some information. For example, it would be useful for the Monitor to know which processor had a particular semaphore at any given time. That way, if some other processor timed out on that semaphore, the Monitor would know who had it. Also, it would be useful for the Monitor to know when a particular application is being run by a processor. If that processor trapped out to the Monitor, the Monitor could then know to use the applications symbol table, rather than the kernels, for analysis.

Explicit Monitor calls lie at the heart of what is meant by "instrumenting" the kernel. These explicit calls allow the kernel to pass information to the Monitor that the Monitor can use in fault analysis. This is a powerful feature. Most ordinary kernels would not be instrumented in this way because of the hit to performance that would be encountered. The RAGE kernel, however, trades off the performance hit, for the ability to track the kernels activities for debugging. The rules in the library will use this tracking feature along with other features, to do fault analysis. The other features would include things like: Using the symbol tables in the ELF format to find the names of routines; Using a feature of the calling convention where calls to sub-routines are always made using gr2 has the return address.

Driver Modification

In order to facilitate faster kernel boot, many of the kernel drivers may have to be modified. On large systems with many I/O cards, kernel boots could be long due to the initialization required for all the I/O devices. Traditionally, the kernel will ensure all I/O devices are initialized before the user can interact with the console. For RAGE however, a delayed I/O initialization could suffice. All drivers, except the core essentials, could be made into LINUX modules. So that, their initialization could be delayed, allowing the user to have console access and the ability to launch RAGE applications that don't require the un-initialized I/O. Once the modules are initialized, RAGE apps can be launched to stress the I/O associated with them. The details of RAGE I/O are a part of the second RAGE development phase. Once the RAGE I/O investigation has been completed, the associated investigation report will give more details on RAGE I/O.

Performance Consideration

Though the Monitor intervention will slowdown the Kernel performance to some degree, it should not so severely degrade the Kernel as to reduce the stress impact of the RAGE applications.

Module Details

Once an error condition has occurred and the error information has been collected, the Monitor will need to begin Fault analysis. To do this, the Monitor will use a rules-based expert system methodology. The rules will be located in the library module. Conceptually, each rule will look something like:

IF (condition0) (condition1) . . . (conditionN) THEN (action0) (action1) . . . (actionN)

There will be a set of such rules in the library module. The rules will be ordered in such a way as to speed up rules processing. In other words, rules that are more likely to be triggered early, will be placed near the start of the rules list. To start Fault analysis, each rule in the rules list will be evaluated sequentially. The conditions in the "IF" part of a rule will actually be function pointers. Each function pointed to will either return 0, or a non-zero value. Zero will represent a "FALSE" condition. When a rule is being evaluated, if the condition is non-zero, it will be a function pointer. That function will then be executed, and the result checked. If the return value of the function is zero, no further conditions of the rule will be evaluated. The rule is then said to be NOT-TRIGGERED. Furthermore, if any of the conditions are zero (i.e. the function pointer is "NULL"), that condition is considered to be FASLE. And, therefore, the rule would also be NOT_TRIGGERED.

If all the conditions of a rule return non-zero, that rule is said to be TRIGGERED. The Monitor will keep evaluating each rule in the rules list, until it gets to a rule that is TRIGGERED. If none of the rules are triggered, the Monitor will indicate this condition and halt. Otherwise, the Monitor will attempt to execute each of the actions specified by the TRIGGERED rule. Once a rule has been TRIGGERED, the Monitor will not evaluate any further rules in the rules list. Also, any trigger rule will be disabled so that it cannot be TRIGGERD again. This feature is intended to speed up rules processing.

The actions of a rule are also function pointers. The Monitor will call the function of each action in a TRIGGERED rule. Each action function will be called sequentially, starting with the first. Once all of the action functions have been called, the Monitor will disable the rule and then start from the beginning of the rules list, looking for the next TRIGGERED rule. See the Data Structure section above for an example of what a rule would look like.

Each rule should have a short text string that basically describes what the rule is trying to due. This feature allows the Monitor to display, in English, to the novice user how it came to its conclusion, during analysis.

There are several debugging features that the Monitor can take advantage of in order to determine the failing FRU:

Kernel Symbol Table

The Kernel will be an ELF-64 binary. As such, it has its symbol table embedded in the binary. The library rules can use this feature to determine where, in the kernel, an error occurred. Applications will also be compiled into ELF-64 formats. Thus, the same technique can be used. For instance, if the address, at which a particular processor failed, is known, the function that it was executing at the time can be determined from the symbol table. Since the symbol table contains all the starting address of the functions contained in the binary.

Procedure Stack Unwind

The Monitor can take advantage of un-winding the stack to trace procedures backwards thru time.

As mentioned, the above exemplary implantation is only one specific example of diagnostic monitor implementation in accordance with principles of the present invention. Thus while this invention has been described in terms of several preferred embodiments, there are alterations, permutations, and equivalents which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A computer-implemented method for diagnosing the performance of a computer system using a diagnostic application, comprising:

providing a diagnostic application;

providing an operating system (OS) kernel, said diagnostic application being configured to execute under said OS kernel in said computer system, said OS kernel having a kernel trap arrangement;

providing a diagnostic monitor, said diagnostic monitor being configured to execute cooperatively with said OS kernel instead of under said OS kernel, said diagnostic monitor having a monitor trap arrangement;

ascertaining, using said diagnostic monitor, whether a trap encountered during execution of said diagnostic application is to be handled by said OS kernel or said diagnostic monitor; and if said trap is to be handled by said OS kernel, passing said trap to said OS kernel for handling.

2. The computer-implemented method of claim 1 wherein said OS kernel is a non-production OS kernel, said non-production OS kernel representing a modified version of a production OS kernel that is provided for use by customers purchasing said computer system, said non-production OS kernel being configured to permit said diagnostic monitor to access information available to said non-production OS kernel with fewer restrictions than a number of restrictions imposed by said production OS kernel.

3. The computer-implemented method of claim 2 wherein said OS kernel is configured to permit said diagnostic monitor to be initialized prior to loading said OS kernel.

4. The computer-implemented method of claim 1 further comprising:

ascertaining, using said diagnostic monitor, if said trap is to handled by said diagnostic monitor, whether said trap represents a monitor call by said diagnostic application; and if said trap represents said monitor call by said diagnostic application, ascertaining using said diagnostic monitor whether said trap represents an error call;

if said trap represents said error call, using said diagnostic monitor for handling said error call.

5. The computer-implemented method of claim 4 wherein said handling said error call comprises ascertaining, using said diagnostic monitor, whether said error call represents a severe error call; and if said error call does not represent said severe error call, returning after said error call has been logged.

6. The computer-implemented method of claim 5 further comprising using said diagnostic monitor for performing, if said error call represents said severe error call, a) sending a freeze signal to any other processor in said computer system, b) collecting state information, and c) performing analysis on said state information.

7. The computer-implemented method of claim 6 further comprising using said diagnostic monitor for performing, if said error call represents said severe error call, d) displaying a result of said analysis in a shell, and e) receiving user input, if any, from said shell.

8. The computer-implemented method of claim 4 further comprising:

if said trap does not represent said error call, using said diagnostic monitor for performing actions requested by information in said trap and returning information obtained from said performing said actions.

9. The computer-implemented method of claim 4 further comprising:

if said trap does not represent said monitor call, ascertaining using said diagnostic monitor whether said trap represents a severe error;

if said trap represents said severe error, using said diagnostic monitor for performing a) sending a freeze signal to any other processor in said computer system, b) collecting state information, and c) performing analysis on said state information.

10. The computer-implemented method of claim 9 further comprising using said diagnostic monitor for performing, if said trap represents said severe error, d) displaying a result of said analysis in a shell, and e) receiving user input, if any, from said shell.

11. The computer-implemented method of claim 4 further comprising:
   if said trap does not represent said monitor call, ascertaining using said diagnostic monitor whether said trap represents a severe error;
   if said trap does not represent said severe error, using said diagnostic monitor for a) collecting state information, and b) performing analysis on said state information.

12. The computer-implemented method of claim 11 further comprising using said diagnostic monitor for performing c) logging error data related to said trap, and d) skipping to next instruction.

13. The computer-implemented method of claim 1 further comprising:
   converting, using said OS kernel, a panic call into a monitor call;
   ascertaining, using said diagnostic monitor, whether said monitor call represents said panic call when said monitor call is received by said diagnostic monitor;
   if said monitor call represents said panic call, using said diagnostic monitor for performing a) sending a freeze signal to any other processor in said computer system, b) collecting state information, and c) performing analysis on said state information.

14. The computer-implemented method of claim 13 further comprising using said diagnostic monitor for performing, if said monitor call represents said panic call, d) displaying a result of said analysis in a shell, and e) receiving user input, if any, from said shell.

15. The computer-implemented method of claim 1 wherein said OS kernel is configured to generate a trap responsive to a time-out event of a kernel timed semaphore.

16. The computer-implemented method of claim 1 wherein said diagnostic monitor is configured to continue executing after said OS kernel crashes.

17. In a computer system, an arrangement for diagnosing the performance of a computer system while executing an application program, said application program being executed under an operating system (OS) kernel, comprising:
   a diagnostic monitor configured to execute cooperatively with said OS kernel, said OS kernel having a kernel trap arrangement for handling at least one of a trap-type message and an interrupt-type message generated during said execution of said application program, said diagnostic monitor being capable of continuing to execute after said OS kernel crashes, said diagnostic monitor including a monitor trap arrangement for handling at least one of said trap-type message and said interrupt-type message, said diagnostic monitor being configured to receive traps generated during said execution of said application program and decide, for a given trap received, whether said OS kernel would handle said trap received or whether said diagnostic monitor would handle said trap received.

18. The arrangement of claim 17 further comprising a loader configured to load said diagnostic monitor prior to loading said OS kernel at system initialization.

19. The arrangement of claim 17 wherein said diagnostic monitor includes monitor logic and a monitor library.

20. The arrangement of claim 19 wherein said monitor library includes computer-implemented code for resolving error conditions to a set of field replaceable units.

21. An article of manufacture comprising a program storage medium having computer readable code embodied therein, said computer readable code being configured to handle errors in a computer system, comprising:
   computer readable code implementing a diagnostic monitor, said diagnostic monitor being configured to execute cooperatively with an operating system (OS) kernel instead of under said OS kernel in said computer system, said diagnostic monitor including a monitor trap arrangement configured to receive traps generated in said computer system, said OS kernel having a kernel trap arrangement configured to handle traps passed from said diagnostic monitor; and
   computer readable code for loading said diagnostic monitor at system startup prior to loading said OS kernel.

22. The article of manufacture of claim 21 wherein said diagnostic monitor is configured to isolate an error generated during execution of an application program executing under said OS kernel to a set of field replaceable units in said computer system.

23. The article of manufacture of claim 21 wherein said computer readable code implementing said diagnostic monitor includes computer readable code implementing monitor logic and computer readable code implementing a monitor library.

24. The article of manufacture of claim 23 wherein said computer readable code implementing said monitor library includes computer implemented code for resolving error conditions to a set of field replaceable units.

25. The article of manufacture of claim 21 wherein said OS-kernel is Linux-based.

26. The article of manufacture of claim 21 wherein said OS kernel is Windows-based.

* * * * *

UNITED STATES PATENT AND TRADEMARK OFFICE
CERTIFICATE OF CORRECTION

| | | |
|---|---|---|
| PATENT NO. | : 6,889,167 B2 | Page 1 of 1 |
| APPLICATION NO. | : 10/376436 | |
| DATED | : May 3, 2005 | |
| INVENTOR(S) | : John W. Curry, III et al. | |

It is certified that error appears in the above-identified patent and that said Letters Patent is hereby corrected as shown below:

IN THE SPECIFICATION

Column 4, line 41, delete "type" and insert therefor --types--

Column 9, line 36, delete "One" and insert therefor --Once--

Column 9, line 51, after "handled" insert --by--

Column 17, line 54, delete "use" and insert therefor --used--

Column 19, line 32, delete "allow" and insert therefor --allows--

Column 19, line 54, delete "nay" and insert therefor --any--

Column 20, line 50, delete "its whishes" and insert therefor --it wishes--

Column 23, line 2, delete "FASLE" and insert therefor --FALSE--

Column 23, line 13, delete "TRIGGERD" and insert therefor --TRIGGERED--

Column 23, line 24, delete "due." and insert therefor --do.--

Column 23, line 38, delete "address" and insert therefor --addresses--

IN THE CLAIMS

Claim 4, Column 24, line 21, after "to" insert --be--

Signed and Sealed this

Sixteenth Day of October, 2007

JON W. DUDAS
*Director of the United States Patent and Trademark Office*